(12) United States Patent
Humfeld

(10) Patent No.: US 9,815,247 B2
(45) Date of Patent: Nov. 14, 2017

(54) SYSTEMS AND METHODS FOR MAKING PREPREG COMPOSITE SHEETS INCLUDING CONTOURED CHARGES

(71) Applicant: The Boeing Company, Huntington Beach, CA (US)

(72) Inventor: Keith Daniel Humfeld, Federal Way, WA (US)

(73) Assignee: THE BOEING COMPANY, Chicago, IL (US)

(*) Notice: Subject to any disclaimer, the term of this patent is extended or adjusted under 35 U.S.C. 154(b) by 166 days.

(21) Appl. No.: 14/630,231

(22) Filed: Feb. 24, 2015

(65) Prior Publication Data

US 2016/0243767 A1    Aug. 25, 2016

(51) Int. Cl.
*B29C 70/00* (2006.01)
*B29C 70/50* (2006.01)
(Continued)

(52) U.S. Cl.
CPC .............. *B29C 70/50* (2013.01); *B29C 70/30* (2013.01); *B29C 70/40* (2013.01); *C08J 5/24* (2013.01);
(Continued)

(58) Field of Classification Search
CPC ....... B29C 70/34; B29C 70/50; B29C 70/504; B29C 70/506; C08J 5/24
(Continued)

(56) References Cited

U.S. PATENT DOCUMENTS

| 4,666,546 A | 5/1987 | Treber |
| 5,390,574 A * | 2/1995 | Schorn ............. B21D 28/002 100/269.01 |

(Continued)

FOREIGN PATENT DOCUMENTS

| DE | 4130269 A1 | 3/1992 |
| DE | 19952443 A1 | 5/2001 |

(Continued)

OTHER PUBLICATIONS

Machine translation of JP 2002249605 date unknown.*

(Continued)

*Primary Examiner* — John Goff
(74) *Attorney, Agent, or Firm* — Armstrong Teasdale LLP

(57) ABSTRACT

A system (100) for making a prepreg composite sheet (300) comprising contoured charges (308) comprises first means (102) for forming precursor outline regions (206) in a resin film layer (200). The system (100) also comprises second means (106) for impregnating a fiber reinforcement (220), comprising fibers (222), with the resin film layer (200), comprising the precursor outline regions (206), to form the prepreg composite sheet (300). The prepreg composite sheet (300), as so formed, comprises non-impregnated outline regions (310) that define the contoured charges (308). The non-impregnated outline regions (310) in the prepreg composite sheet (300) correspond to the precursor outline regions (206) in the resin film layer (200). The system (100) further comprises third means (104) for guiding the fiber reinforcement (220) and the resin film layer (200) to the second means (106). The resin film layer (200) comprises the precursor outline regions (206) formed by first means (102).

20 Claims, 15 Drawing Sheets

(51) Int. Cl.
*B29C 70/30* (2006.01)
*B29C 70/40* (2006.01)
*C08J 5/24* (2006.01)
*B29L 31/30* (2006.01)

(52) U.S. Cl.
CPC ........... *B29C 2793/0009* (2013.01); *B29C 2793/0081* (2013.01); *B29L 2031/3076* (2013.01); *C08J 2300/22* (2013.01)

(58) Field of Classification Search
USPC .................................................. 156/256, 257
See application file for complete search history.

(56) References Cited

U.S. PATENT DOCUMENTS

| | | | | |
|---|---|---|---|---|
| 5,520,772 A | * | 5/1996 | Levitan | B32B 37/06 100/304 |
| 2010/0199827 A1 | | 8/2010 | Colegrove | |
| 2013/0037198 A1 | | 2/2013 | Safai et al. | |

FOREIGN PATENT DOCUMENTS

| | | | |
|---|---|---|---|
| EP | 2730914 A1 | | 5/2014 |
| JP | 60072707 A | * | 4/1985 |
| JP | 2001105430 A | * | 4/2001 |
| JP | 2002249605 A | * | 9/2002 |
| JP | 2012045573 A | * | 3/2012 |
| TW | 200843600 A | * | 11/2008 |
| WO | 2012052272 A1 | | 4/2012 |

OTHER PUBLICATIONS

Machine translation of JP 2012045573 date unknown.*
Machine translation of JP 2001105430 date unknown.*
Machine translation of JP 60072707 date unknown.*
Extended European Search Report, dated Jul. 25, 2016, for co-pending EP patent application No. EP 16155052.0 (6 pgs.).

* cited by examiner

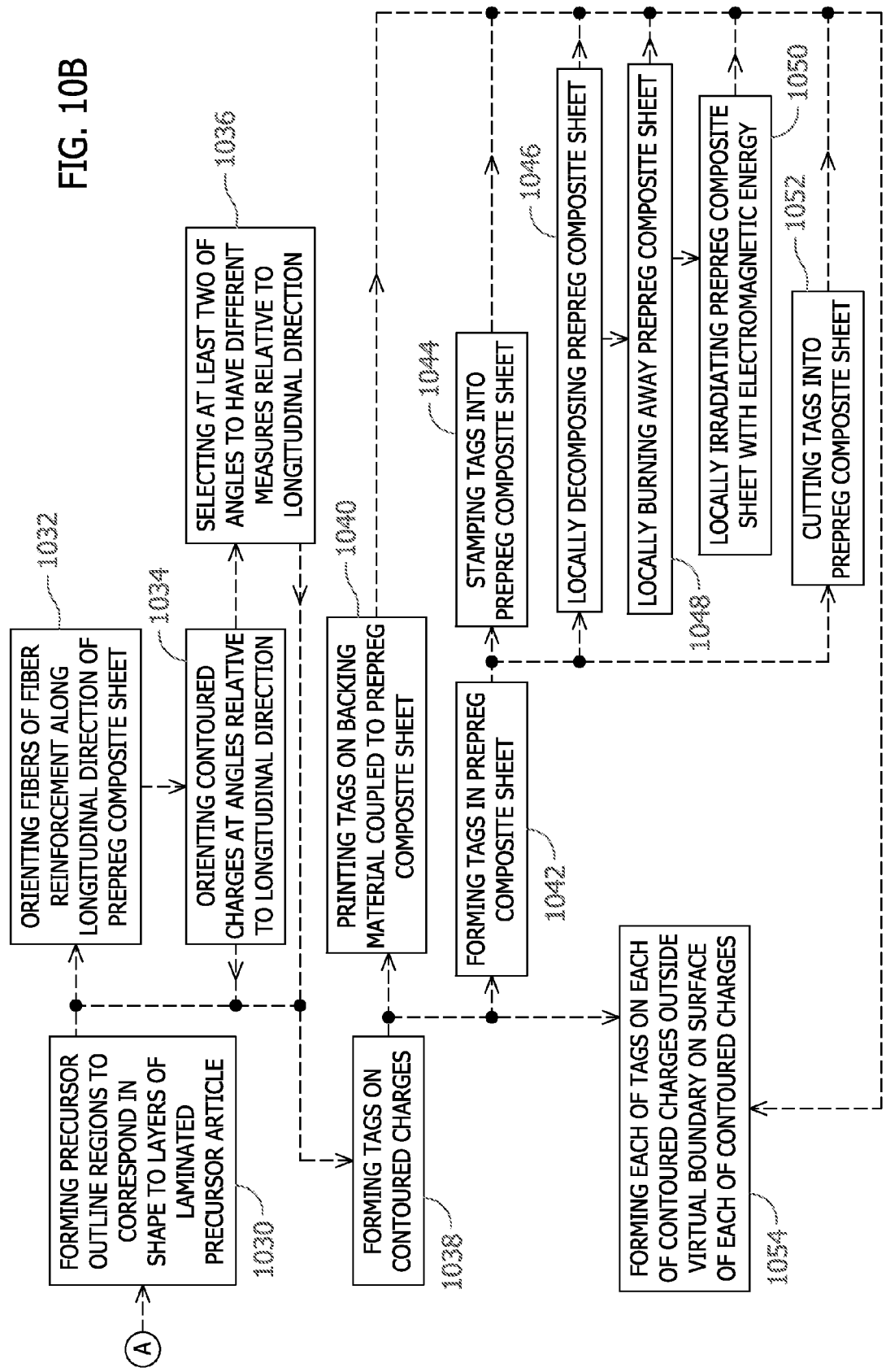

SYSTEMS AND METHODS FOR MAKING PREPREG COMPOSITE SHEETS INCLUDING CONTOURED CHARGES

BACKGROUND

At least some known laminated composite articles are made from shaped charges of prepreg composite material that includes reinforcement fibers, such as carbon fibers, pre-impregnated with resin. Typically, a manufacturer of the laminated composite article obtains a supply of prepreg composite material having a unitary fiber direction, and cuts the shaped charges, each approximating the shape of the part, from the prepreg composite material at the point of manufacture of the laminated composite article. This process is time-consuming and typically requires the manufacturer of the laminated composite article to purchase and maintain high-cost computer-numerically-controlled (CNC) equipment for precision cutting of the shaped charges. Thus, the process of cutting the shaped charges increases process cycle time and cost for the manufacturer of the laminated composite article.

SUMMARY

Manufacturers of laminated composite articles would benefit from a supplier of the prepreg composite material that can move the cycle time and cost of producing the shaped charges upstream in the manufacturing process.

Accordingly, apparatuses and methods, intended to address the above-identified concerns, would find utility.

The following is a non-exhaustive list of examples, which may or may not be claimed, of the subject matter according the present disclosure.

One example of the present disclosure relates to a system for making a prepreg composite sheet comprising contoured charges. The system comprises first means for forming precursor outline regions in a resin film layer. The system also comprises second means for impregnating a fiber reinforcement with the resin film layer to form the prepreg composite sheet, which comprises non-impregnated outline regions that define the contoured charges in the prepreg composite sheet. The fiber reinforcement comprises fibers and the resin film layer comprises precursor outline regions. The non-impregnated outline regions in the prepreg composite sheet correspond to the precursor outline regions in the resin film layer. The system further comprises third means for guiding the fiber reinforcement and the resin film layer to the second means. The resin film layer comprises the precursor outline regions formed by the first means.

Another example of the present disclosure relates to a method of making a prepreg composite sheet comprising contoured charges. The method comprises forming precursor outline regions in a resin film layer. The resin film layer has a viscosity. The method also comprises impregnating a fiber reinforcement having fibers with the resin film layer to form non-impregnated outline regions. The non-impregnated outline regions define the contoured charges in the prepreg composite sheet. The non-impregnated outline regions correspond to the precursor outline regions in the resin film layer.

BRIEF DESCRIPTION OF THE DRAWINGS

Figure 1A:
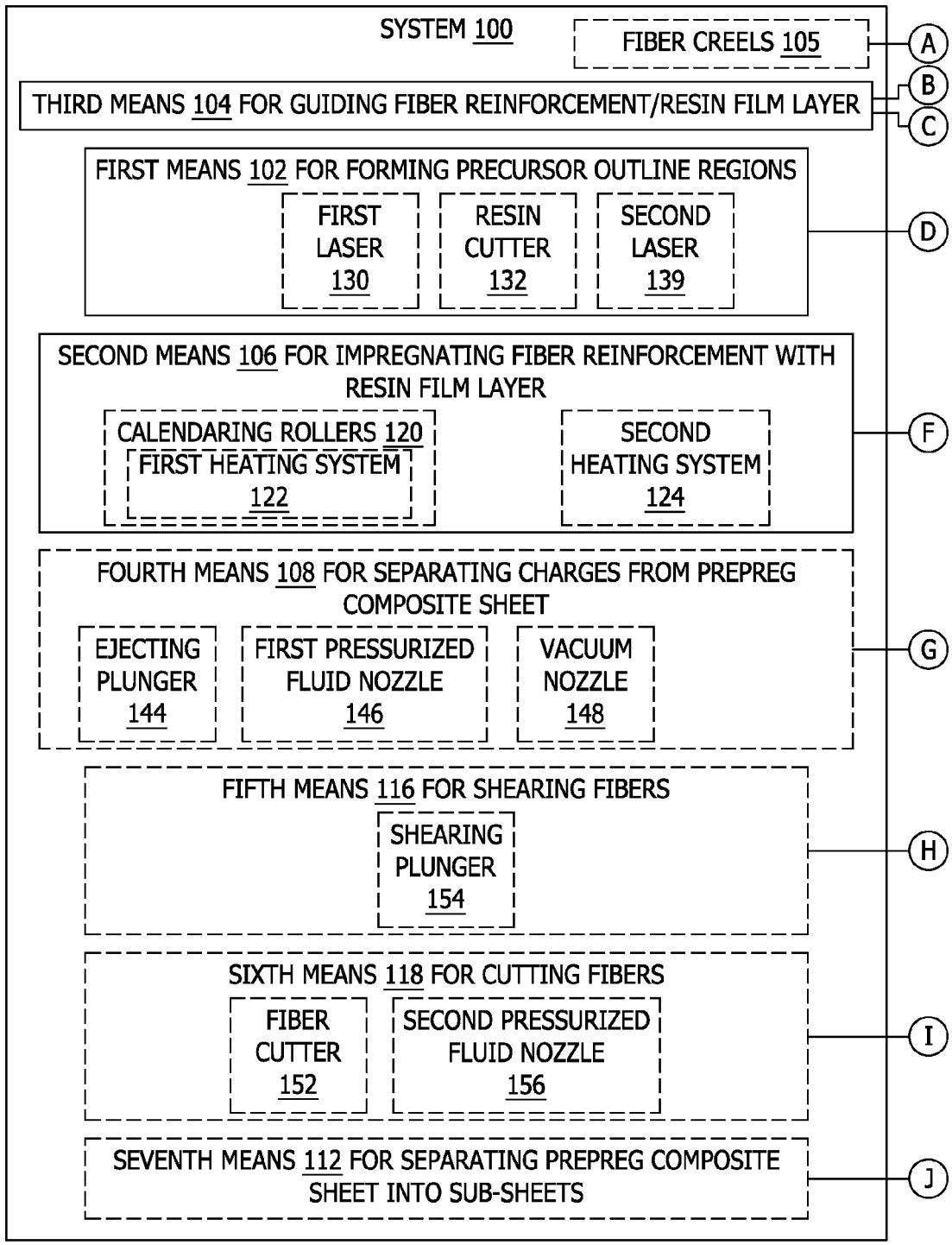
Figure 1B:
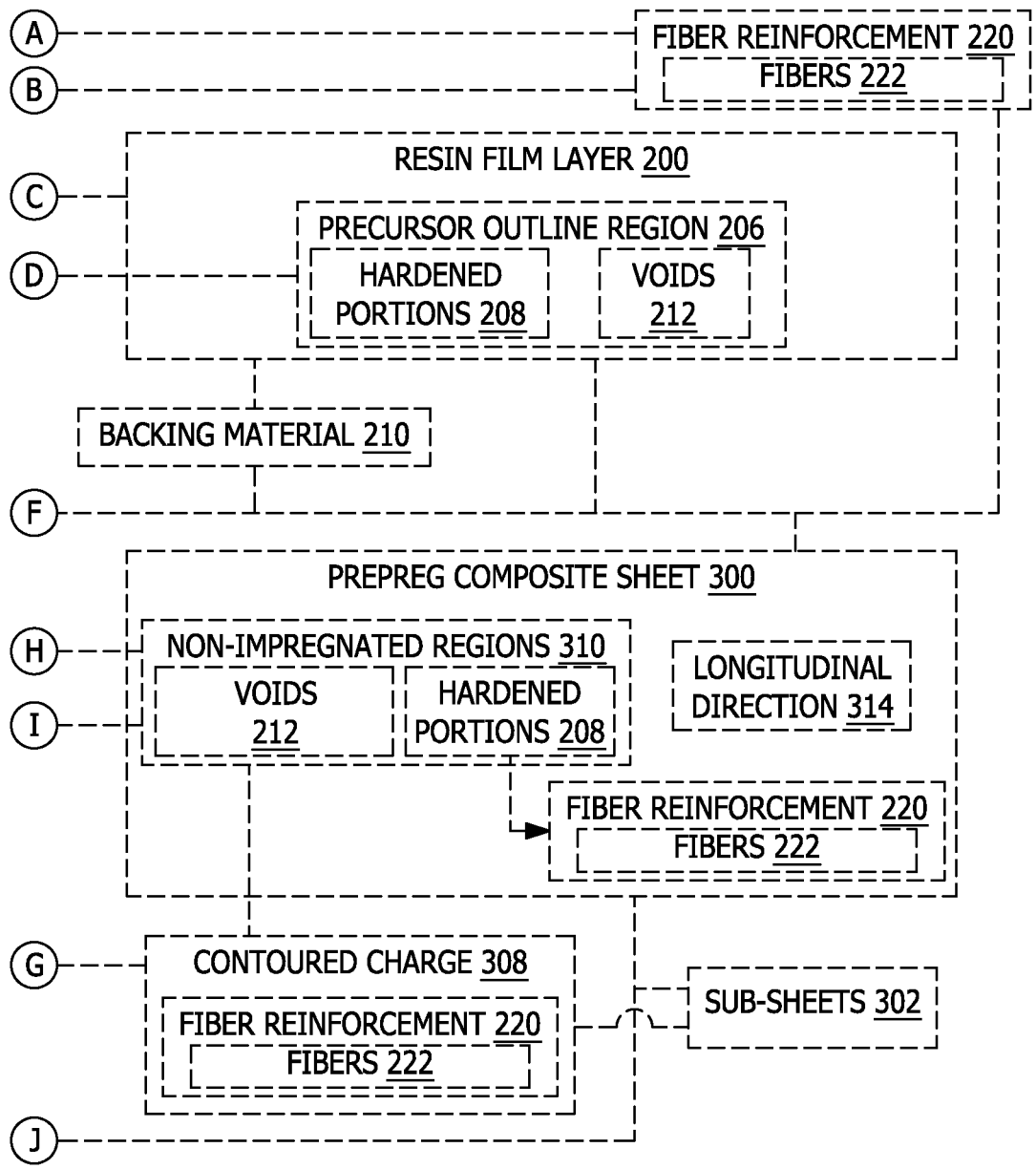
Figure 2:
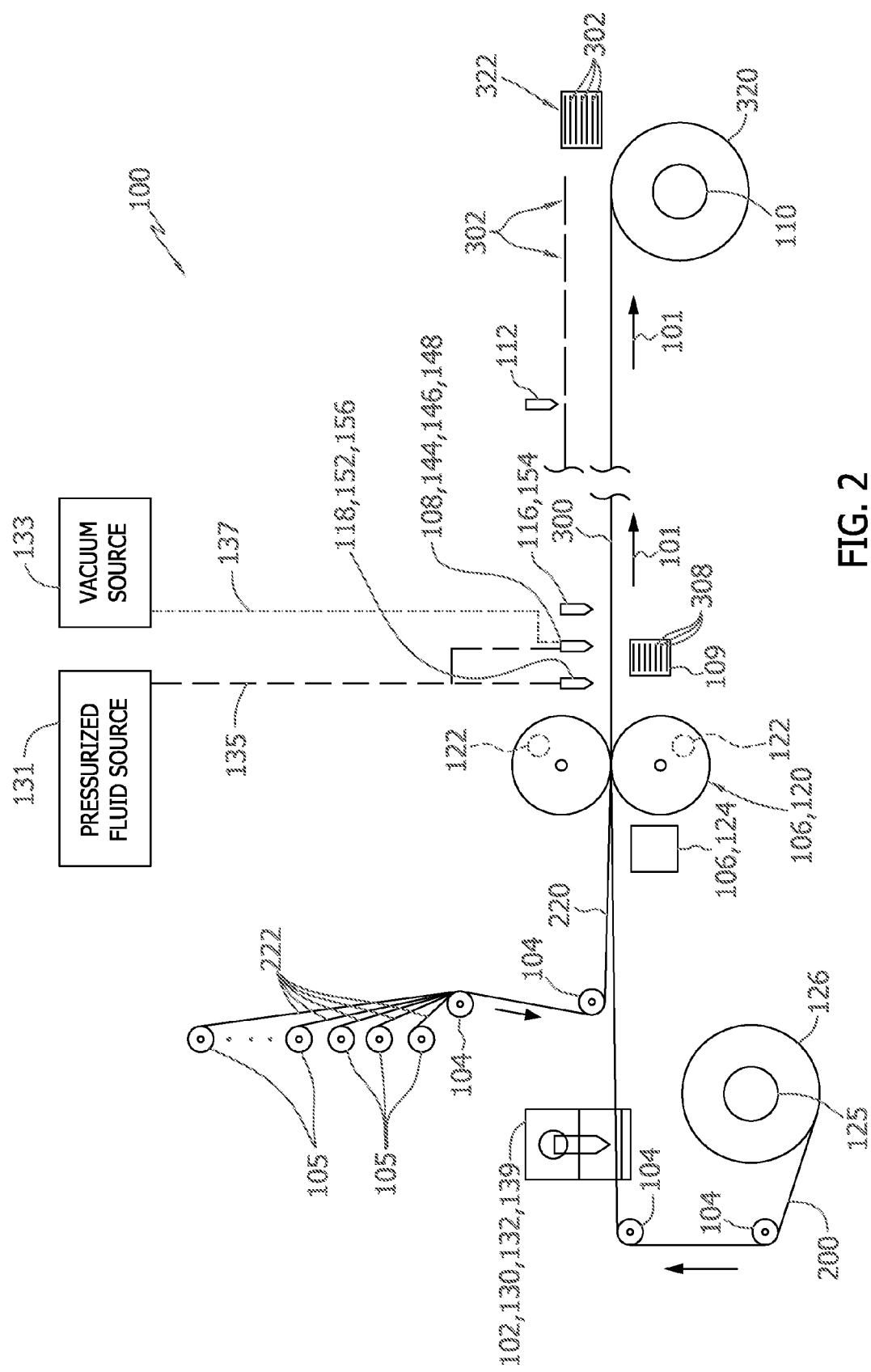
Figure 3:
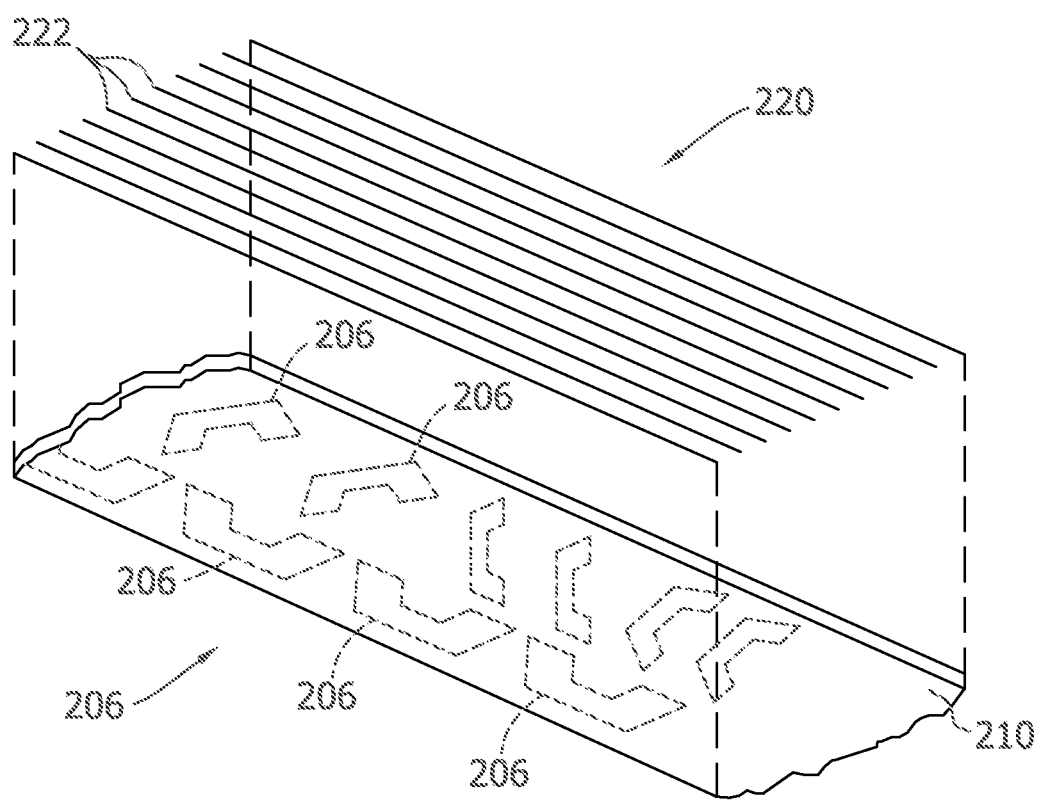
Figure 4A:
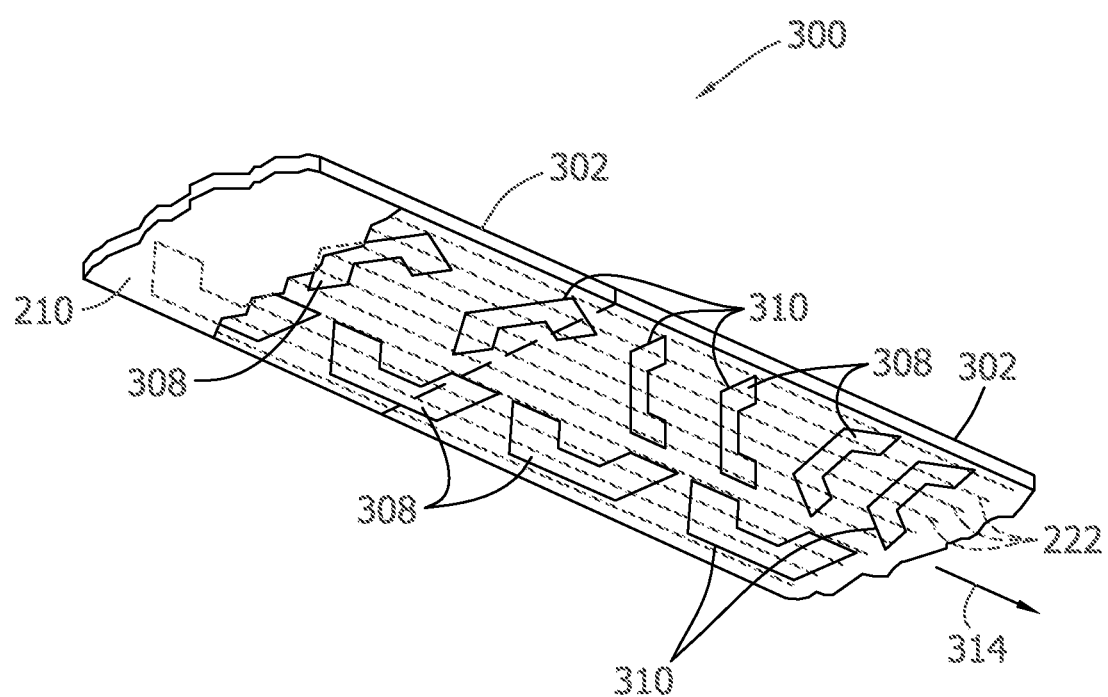
Figure 4B:
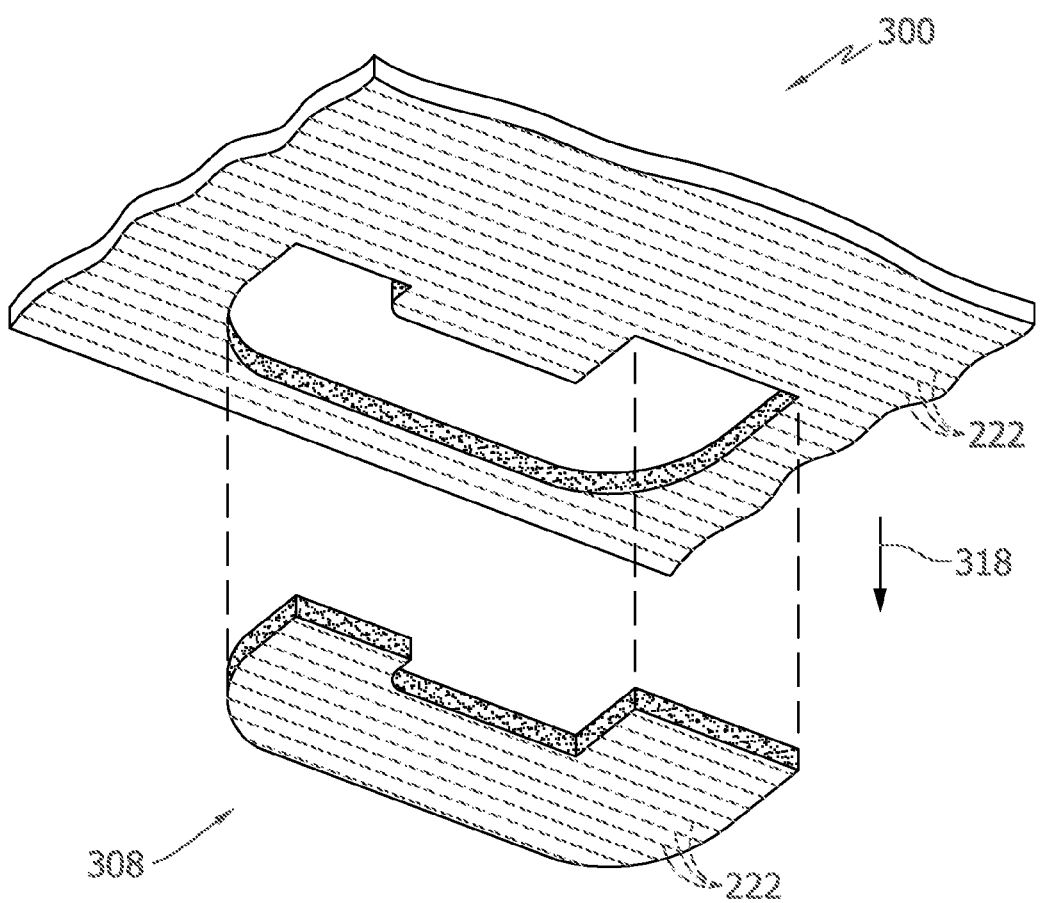
Figure 5A:
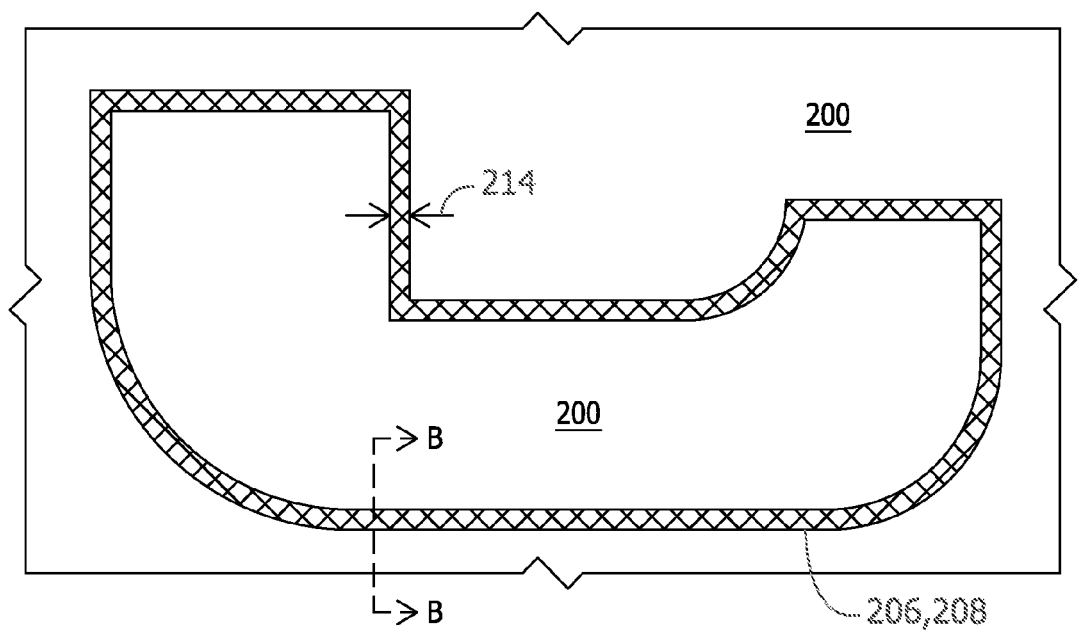
Figure 5B:
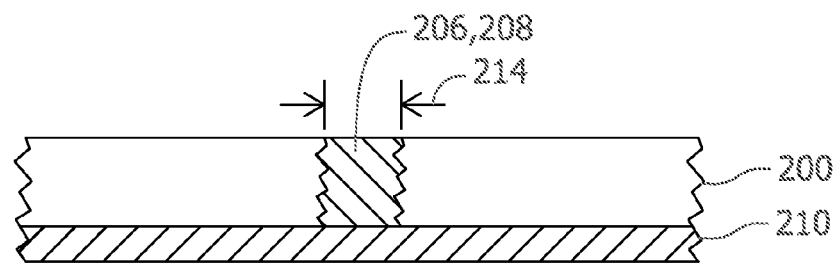
Figure 5C:
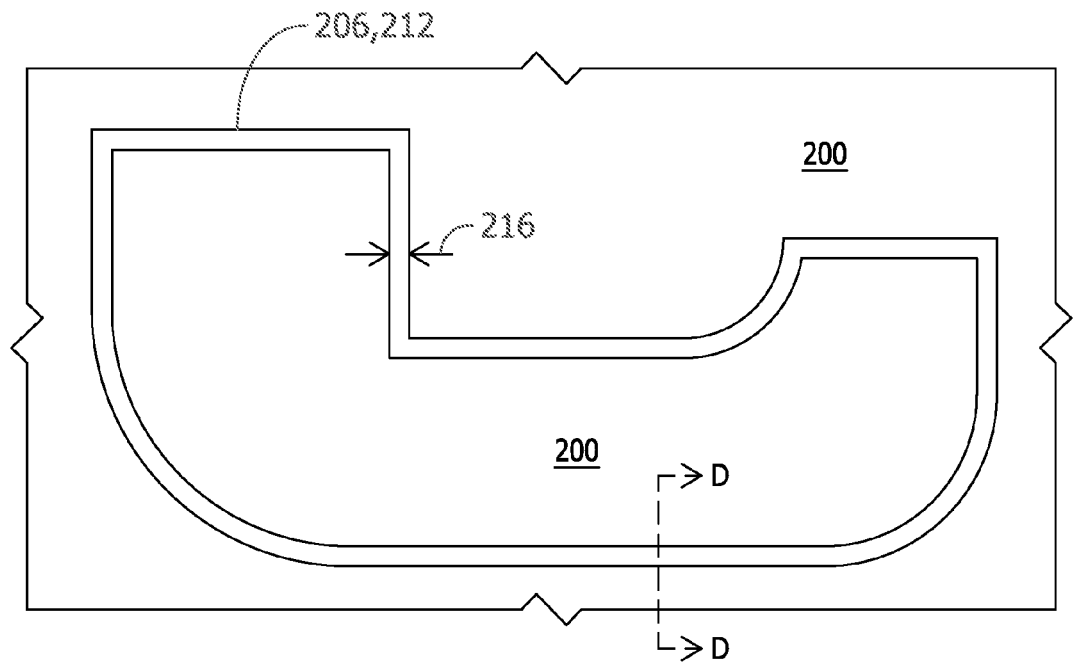
Figure 5D:
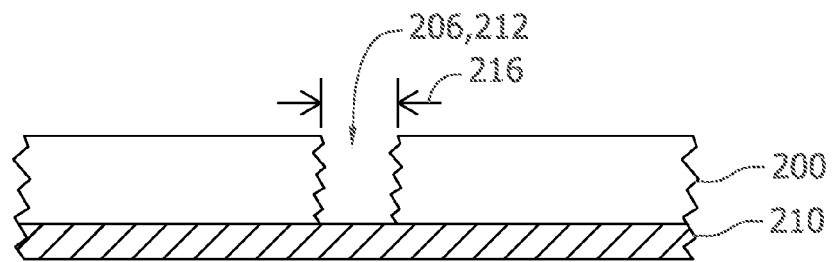
Figure 6:
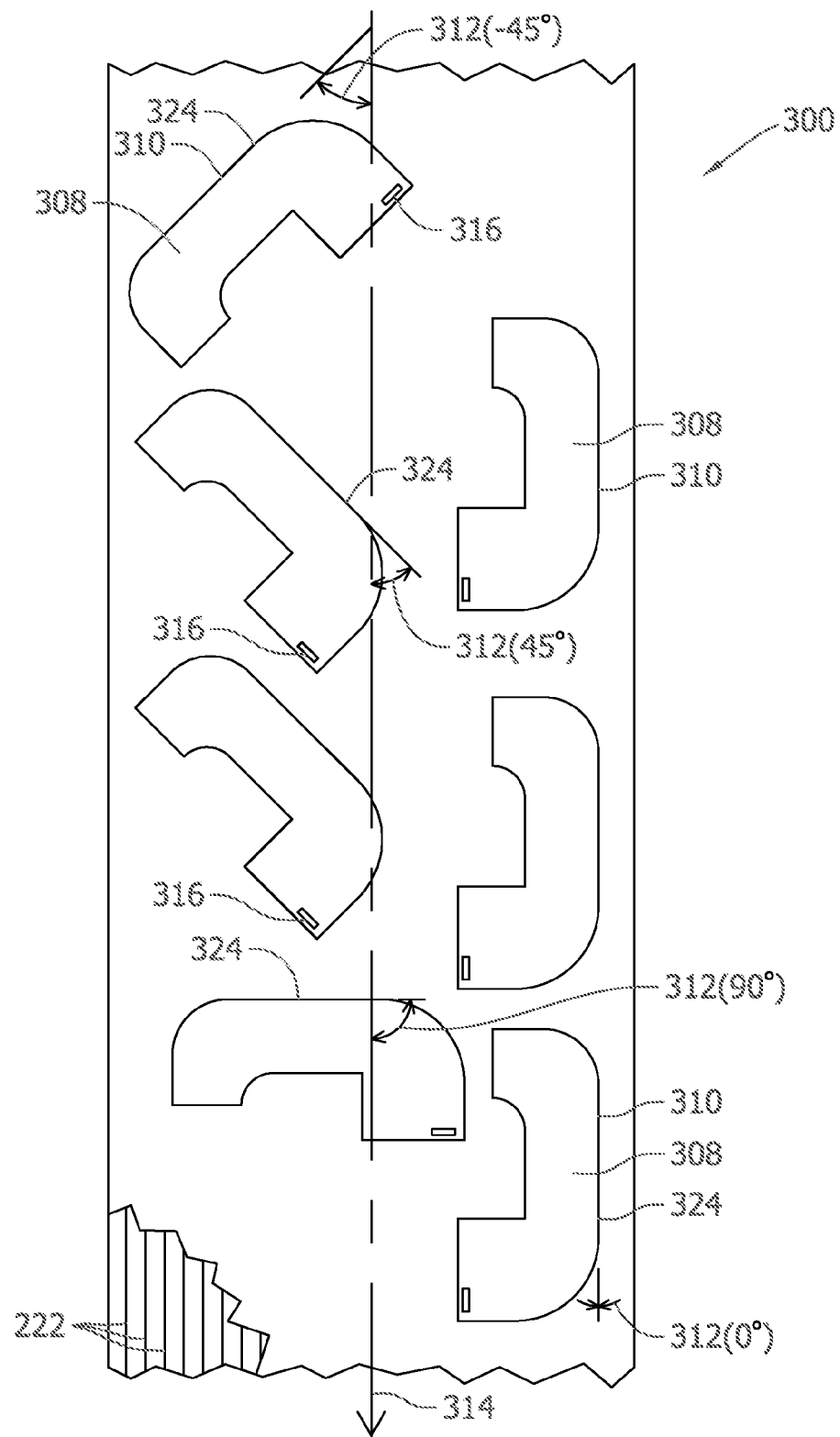
Figure 7A:
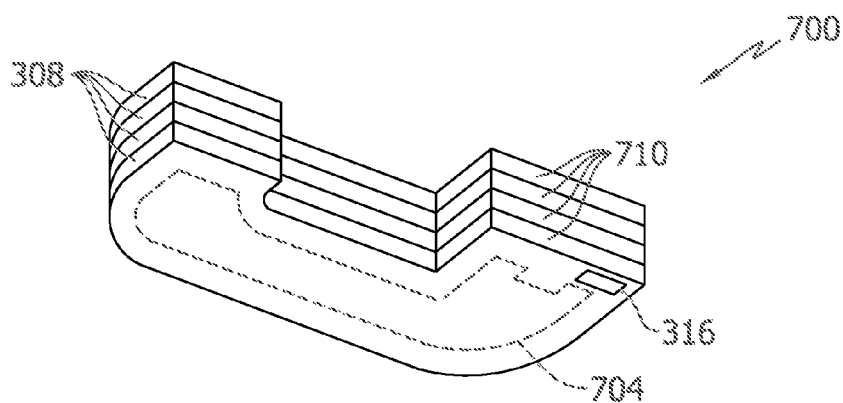
Figure 7B:
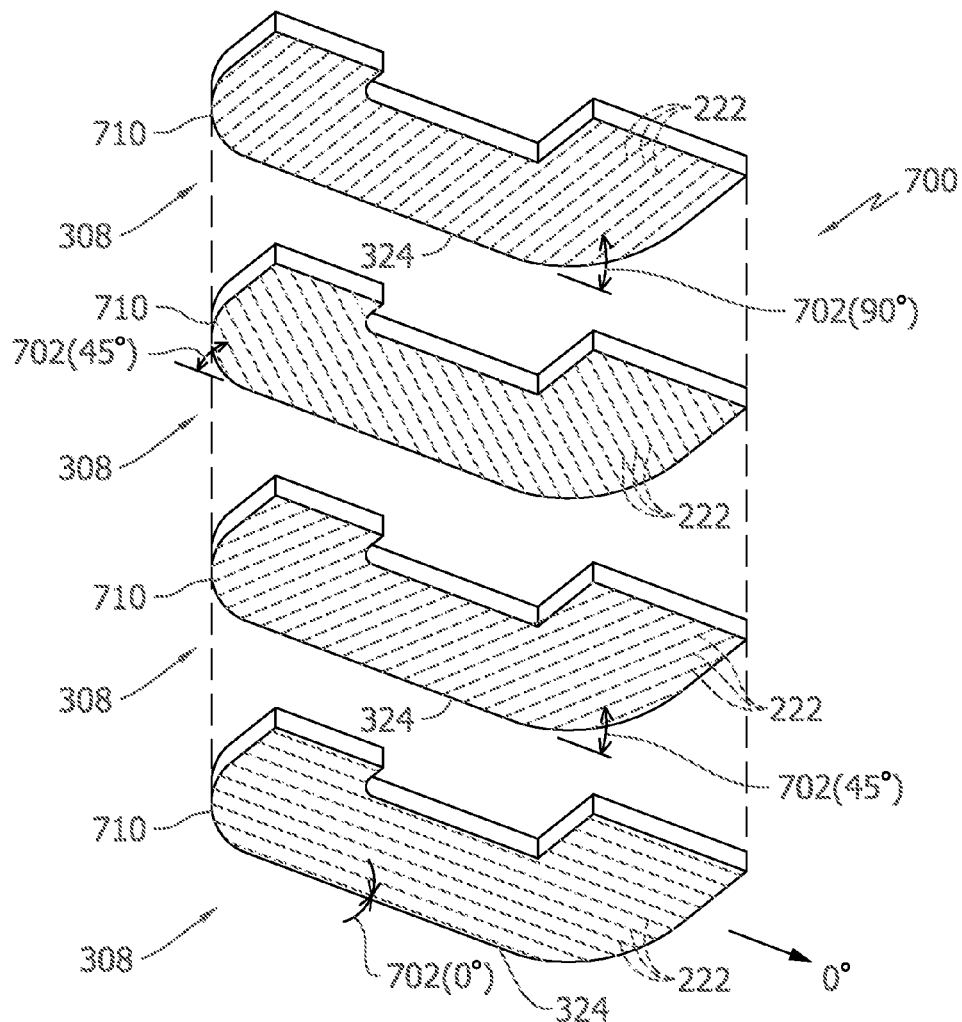
Figure 8:
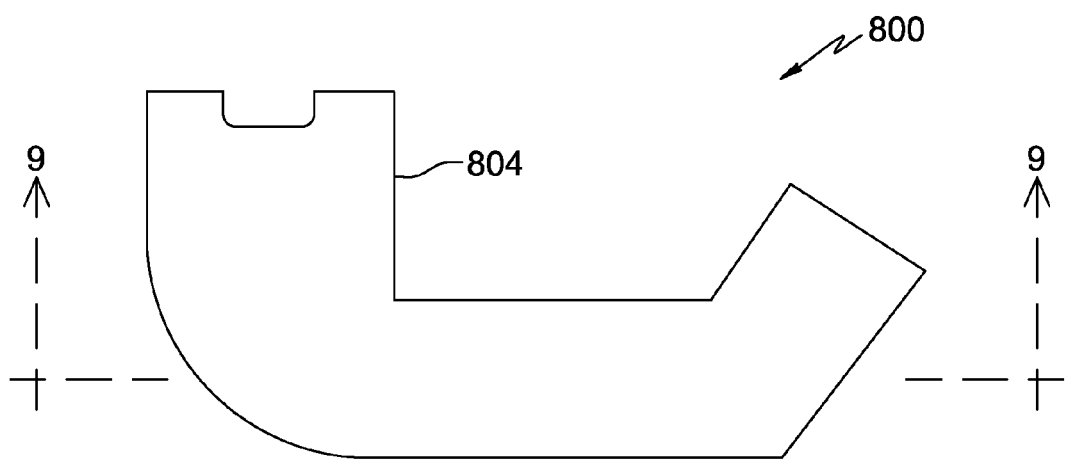
Figure 9:
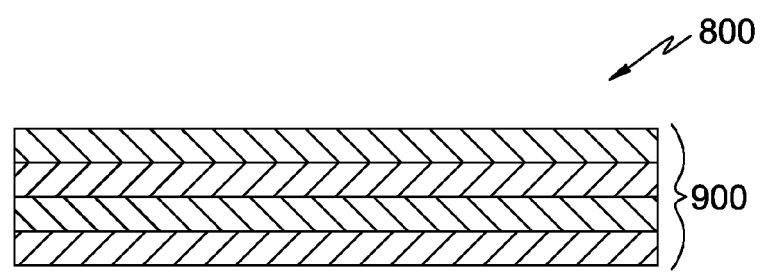
Figure 10A:
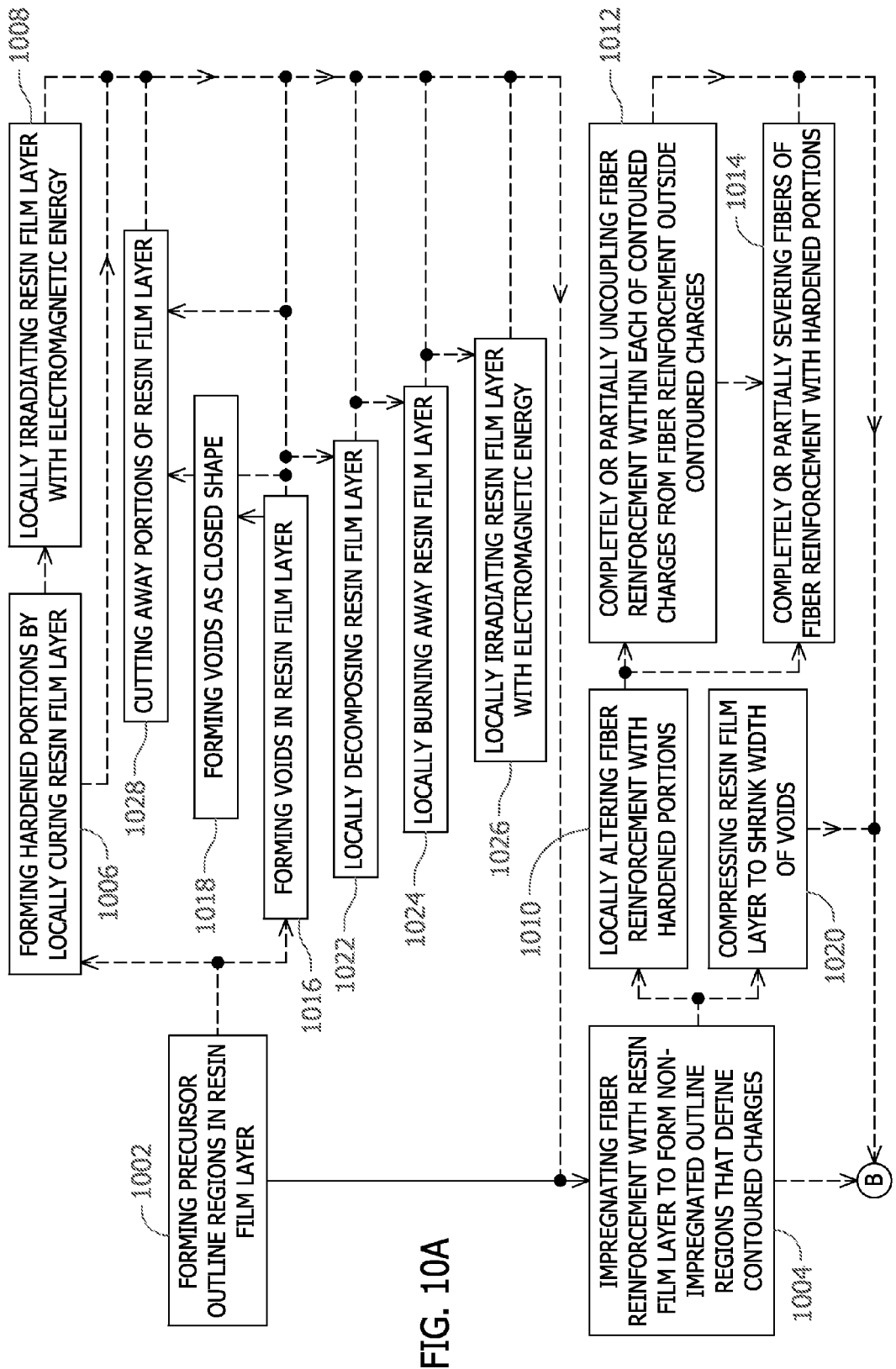
Figure 11:
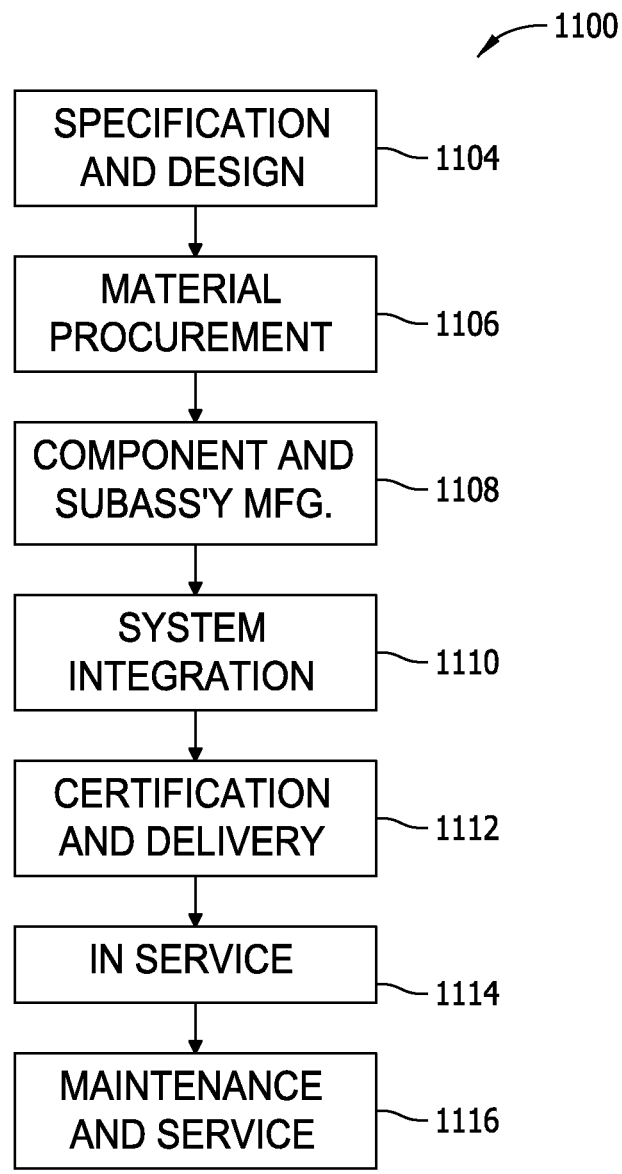

Having thus described examples of the present disclosure in general terms, reference will now be made to the accompanying drawings, which are not necessarily drawn to scale, and wherein like reference characters designate the same or similar parts throughout the several views, and wherein:

FIG. 1A is a first portion of a block diagram of a system for making a prepreg composite sheet comprising contoured charges, according to one or more examples of the present disclosure;

FIG. 1B is a second portion of the block diagram of the system for making the prepreg composite sheet comprising contoured charges, according to one or more examples of the present disclosure;

FIG. 2 is a schematic view of the system of FIGS. 1A and 1B, according to one or more examples of the present disclosure;

FIG. 3 is a schematic perspective view of a resin film layer and a fiber reinforcement capable of being processed by the system of FIG. 2, according to one or more examples of the present disclosure;

FIG. 4A is a schematic perspective view of a prepreg composite sheet that comprises contoured charges and is capable of being formed by the system of FIG. 2, according to one or more examples of the present disclosure;

FIG. 4B is a schematic perspective view of one of the contoured charges separated from the prepreg composite sheet of FIG. 4A, according to one or more examples of the present disclosure;

FIG. 5A is a schematic top view of the resin film layer of FIG. 3, according to one or more examples of the present disclosure;

FIG. 5B is a schematic section view of the resin film layer of FIG. 5A along line B-B shown in FIG. 5A, according to one or more examples of the present disclosure;

FIG. 5C is a schematic top view of the resin film layer of FIG. 3, according to one or more examples of the present disclosure;

FIG. 5D is a schematic section view of the resin film layer of FIG. 5C along line D-D shown in FIG. 5C, according to one or more examples of the present disclosure;

FIG. 6 is a schematic top view of the prepreg composite sheet of FIG. 4A, illustrating contoured charges comprising tags, according to one or more examples of the present disclosure;

FIG. 7A is a schematic perspective view of a laminate precursor article formed from the contoured charges of FIG. 4A, according to one or more examples of the present disclosure;

FIG. 7B is a schematic exploded view of the laminate precursor article of FIG. 7A, according to one or more examples of the present disclosure;

FIG. 8 is a schematic top view of a laminate composite article formed from the laminate precursor article of FIG. 7A, according to one or more examples of the present disclosure;

FIG. 9 is a schematic section view of the laminate composite article of FIG. 8 along line 9-9 shown in FIG. 8, according to one or more examples of the present disclosure;

FIG. 10A is a first portion of a block diagram of a method of making a prepreg composite sheet comprising contoured charges, according to one or more examples of the present disclosure;

FIG. 10B is a second portion of the block diagram of the method of making an indexed prepreg composite sheet, according to one or more examples of the present disclosure;

FIG. 11 is a block diagram of aircraft production and service methodology; and

Figure 12:
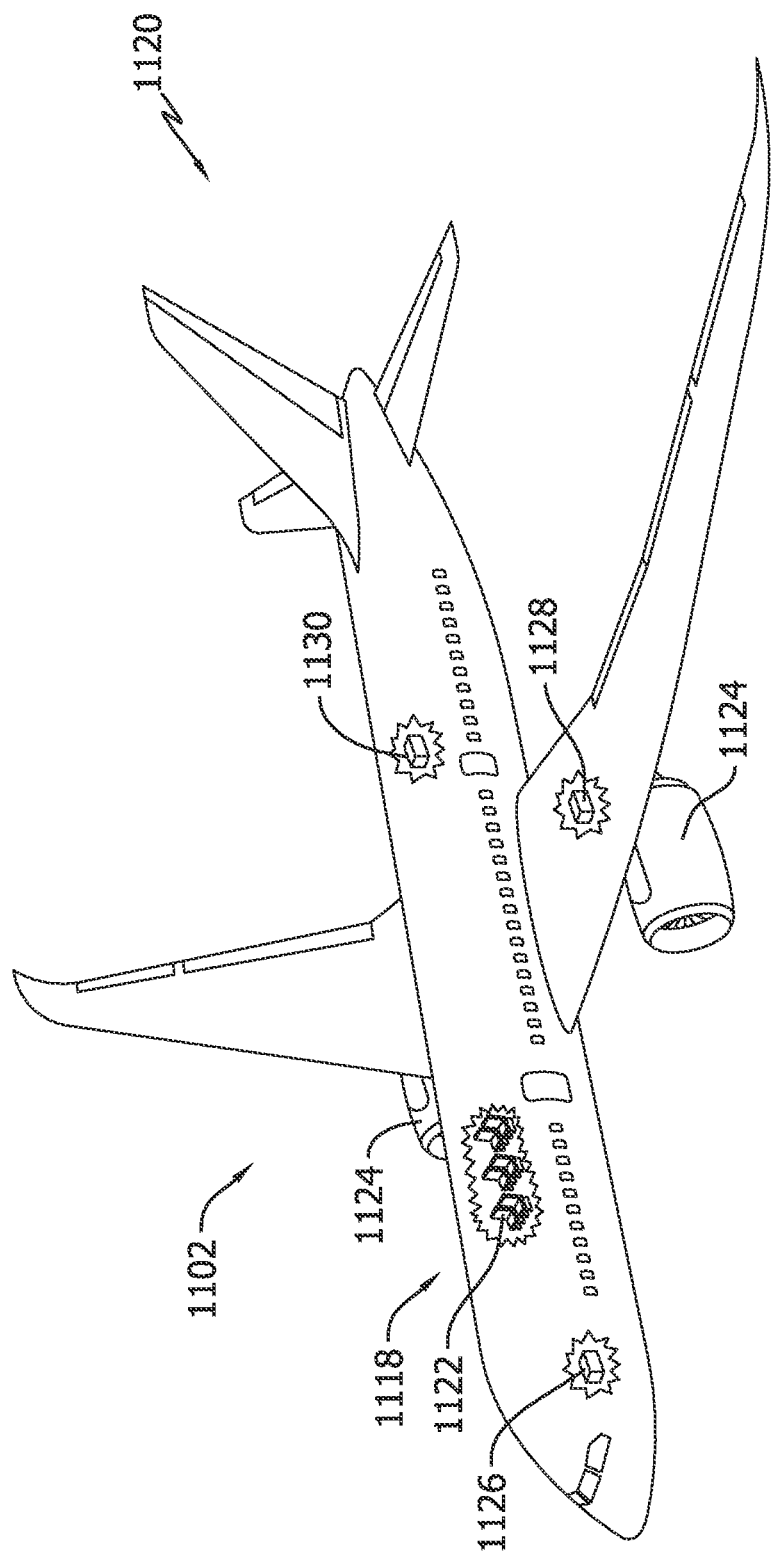

FIG. 12 is a schematic illustration of an aircraft.

DETAILED DESCRIPTION

In FIGS. 1A and 1B, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative or optional examples of the present disclosure. Likewise, elements and/or components, if any, represented with dashed lines, indicate alternative or optional examples of the present disclosure. Environmental elements, if any, are represented with dotted lines. Virtual imaginary elements may also be shown for clarity. Those skilled in the art will appreciate that some of the features illustrated in FIGS. 1A and 1B may be combined in various ways without the need to include other features described in FIGS. 1A and 1B, other drawing figures, and/or the accompanying disclosure, even though such combination or combinations are not explicitly illustrated herein. Similarly, additional features not limited to the examples presented, may be combined with some or all of the features shown and described herein.

In FIGS. 10A, 10B, 11, and 12, referred to above, the blocks may represent operations and/or portions thereof and lines connecting the various blocks do not imply any particular order or dependency of the operations or portions thereof. Blocks represented by dashed lines indicate optional operations and/or portions thereof. Dashed lines, if any, connecting the various blocks represent optional dependencies of the operations or portions thereof. It will be understood that not all dependencies among the various disclosed operations are necessarily represented. FIGS. 10A, 10B, 11, and 12 and the accompanying disclosure describing the operations of the methods set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according to the present disclosure are provided below.

Referring e.g., to FIGS. 1A, 1B, 2, 3, 4A, and 6, system 100 for making prepreg composite sheet 300 comprising contoured charges 308 is disclosed. System 100 comprises first means 102 for forming precursor outline regions 206 in resin film layer 200. System 100 also comprises second means 106 for impregnating fiber reinforcement 220 with resin film layer 200 to form prepreg composite sheet 300, which comprises non-impregnated outline regions 310 that define contoured charges 308 in the prepreg composite sheet 300. Fiber reinforcement 220 comprises fibers 222 and resin film layer 200 comprises precursor outline regions 206. Non-impregnated outline regions 310 in prepreg composite sheet 300 correspond to precursor outline regions 206 in resin film layer 200. System 100 further comprises third means 104 for guiding fiber reinforcement 220 and resin film layer 200 to second means 106. Resin film layer 200 comprises precursor outline regions 206 formed by first means 102. The preceding subject matter of this paragraph is in accordance with example 1 of the present disclosure.

The capability of system 100 to form contoured charges 308 when prepreg composite sheet 300 is formed, such as by a supplier of prepreg sheet material, relieves an end user of prepreg composite sheet 300, such as a manufacturer of a laminate composite article, of the task of mapping charges on the prepreg composite sheet, and in some embodiments of the task of cutting the charges from the prepreg composite sheet, thereby reducing a manufacturing cycle time, equipment cost, and labor burden on the end user.

As used herein, any means-plus-function clause is to be interpreted under 35 U.S.C. 112(f), unless otherwise explicitly stated. It should be noted that examples provided herein of any structure, material, or act in support of any means-plus-function clause, and equivalents thereof, may be utilized individually or in combination. Thus, while various structures, materials, or acts may be described in connection with a means-plus-function clause, any combination thereof or of their equivalents is contemplated in support of such means-plus-function clause.

For example, but not by way of limitation, contoured charges 308 within prepreg composite sheet 300 are configured to form corresponding layers 710 of laminated precursor article 700, shown in FIGS. 7A and 7B. Fibers 222 of fiber reinforcement 220 are oriented along longitudinal direction 314 of prepreg composite sheet 300, and contoured charges 308 are oriented at angles 312 relative to longitudinal direction 314, as shown in FIG. 6. Each of angles 312 corresponds to one of predetermined ideal orientation directions 702 of fibers 222 within laminated precursor article 700. After contoured charges 308 are stacked to form laminated precursor article 700, laminated precursor article 700 is cured and trimmed along virtual boundary 704 to form derivative article 800 having layers 900, shown in FIGS. 8 and 9. It should be noted that, although laminated precursor article 700 and contoured charges 308, as well as derivative article 800, are illustrated with particular shapes for purposes of explanation, laminated precursor article 700 and contoured charges 308, as well as derivative article 800, may have any suitable shape that can be formed by the systems and methods described herein.

For example, but not by way of limitation, third means 104 is suitably configured to receive fibers 222, such as from fiber creels 105, arrange fibers 222 into fiber reinforcement 220, and convey fiber reinforcement 220 in machine direction 101 to second means 106. For example, but not by way of limitation, third means 104 is suitably configured to receive resin film layer 200, such as from standard roll 126 of resin film layer 200 disposed on spindle 125, and convey resin film layer 200 in machine direction 101 to second means 106.

Referring generally to FIGS. 1A and 1B, and particularly to e.g. FIG. 2, second means 106 for impregnating fiber reinforcement 220 with resin film layer 200 comprises at least two calendaring rollers 120. The preceding subject matter of this paragraph is in accordance with example 2 of the present disclosure, and example 2 includes the subject matter of example 1, above.

The at least two calendaring rollers 120 facilitate forming prepreg composite sheet 300 by impregnating fiber reinforcement 220 with resin film layer 200.

For example, but not by way of limitation, calendaring rollers 120 are positioned such that a gap is formed between their respective outer surfaces. For example, but not by way of limitation, the gap is sized to receive resin film layer 200 and fiber reinforcement 220 such that the respective outer surfaces of calendaring rollers 120 cooperate to exert a predetermined pressure on resin film layer 200 and fiber reinforcement 220 to facilitate impregnating fiber reinforcement 220 with resin film layer 200. For example, but not by way of limitation, the respective outer surfaces of calendaring rollers 120 each are rotatable to cooperate with third means 104 to move fiber reinforcement 220 and resin film layer 200 in machine direction 101.

Referring generally to FIGS. 1A and 1B, and particularly to e.g. FIG. 2, second means 106 for impregnating fiber reinforcement 220 with resin film layer 200 further comprises first heating system 122 configured to heat at least one of the at least two calendaring rollers 120. The preceding subject matter of this paragraph is in accordance with example 3 of the present disclosure, and example 3 includes the subject matter of example 2, above.

First heating system 122 facilitates forming prepreg composite sheet 300 by facilitating impregnating fiber reinforcement 220 with resin film layer 200.

For example, but not by way of limitation, first heating system 122 transfers heat to resin film layer 200 sufficient to reduce the viscosity of resin film layer 200 to a predetermined level that facilitates impregnating fiber reinforcement 220 with resin film layer 200.

Referring generally to FIGS. 1A and 1B, and particularly to e.g. FIG. 2, first heating system 122 is internal to at least one of the at least two calendaring rollers 120. The preceding subject matter of this paragraph is in accordance with example 4 of the present disclosure, and example 4 includes the subject matter of example 3, above.

First heating system 122 internal to at least one of at least two calendaring rollers 120 facilitates efficient and well-controlled heat transfer to resin film layer 200.

For example, but not by way of limitation, first heating system 122 includes heating elements proximate the outer surface of at least one of two calendaring rollers 120 to transfer heat from the outer surface to resin film layer 200.

Referring generally to FIGS. 1A and 1B, and particularly to e.g. FIG. 2, second means 106 for impregnating fiber reinforcement 220 with resin film layer 200 further comprises second heating system 124 external to the at least two calendaring rollers 120. The preceding subject matter of this paragraph is in accordance with example 5 of the present disclosure, and example 5 includes the subject matter of any of examples 3 or 4, above.

Second heating system 124 enables transfer of additional heat to resin film layer 200 in certain prepreg forming applications in which first heating system 122 internal to at least one of calendaring rollers 120 is not configured to supply a desired amount of heat.

For example, but not by way of limitation, second heating system 124 is located upstream, relative to machine direction 101, from calendaring rollers 120 and enables controlled preheating of resin film layer 200.

Referring generally to FIGS. 1A, 1B, 2, 3, 4A, and 6, and particularly to e.g. FIGS. 5A and 5B, first means 102 for forming precursor outline regions 206 comprises first laser 130 configured to form hardened portions 208 by locally curing resin film layer 200. The preceding subject matter of this paragraph is in accordance with example 6 of the present disclosure, and example 6 includes the subject matter of any of examples 1-5, above.

Forming hardened portions 208 using first laser 130 enables accurate placement of precursor outline regions 206, and enables formation of precursor outline regions 206 with little or no debris.

For example, but not by way of limitation, first laser 130 is a computer numerically controlled ("CNC") device that is programmed to direct electromagnetic energy for a predetermined time at each precursor outline region 206 to locally cure resin film layer 200 sufficiently to form hardened portions 208 of resin at each precursor outline region 206. For another example, but not by way of limitation, hardened portions 208 of resin substantially prevent impregnation of fiber reinforcement 220 with resin film layer 200 along precursor outline regions 206 during subsequent formation of prepreg composite sheet 300.

Referring generally to FIGS. 1A, 1B, 2, 3, 4A, and 6, and particularly to e.g. FIGS. 5A and 5B, second means 106 for impregnating fiber reinforcement 220 with resin film layer 200 is capable of locally altering fiber reinforcement 220 with hardened portions 208. The preceding subject matter of this paragraph is in accordance with example 7 of the present disclosure, and example 7 includes the subject matter of example 6, above.

The capability of second means 106 to locally alter fiber reinforcement 220 with hardened portions 208 eliminates or reduces a need for additional equipment to shear or cut fibers 222 along non-impregnated outline regions 310 to remove contoured charges 308 from prepreg composite sheet 300.

For example, but not by way of limitation, second means 106 forces fiber reinforcement 220 and resin film layer 200 together under pressure, such as using calendaring rollers 120, causing hardened portions 208 to alter fiber reinforcement 220. For another example, but not by way of limitation, fibers 222 of fiber reinforcement 220 are locally displaced within prepreg composite sheet 300 by hardened portions 208. For another example, but not by way of limitation, hardened portions 208 become lodged within fiber reinforcement 220 and substantially prevent impregnation of fiber reinforcement 220 with resin film layer 200 along non-impregnated outline regions 310.

Referring generally to FIGS. 1A, 1B, 2, 3, 4A, and 6, and particularly to e.g. FIGS. 5A and 5B, second means 106 for impregnating fiber reinforcement 220 with resin film layer 200 is capable of locally altering fiber reinforcement 220 with hardened portions 208 to at least one of completely or partially uncouple fiber reinforcement 220 within each of contoured charges 308 from fiber reinforcement 220 outside contoured charges 308. The preceding subject matter of this paragraph is in accordance with example 8 of the present disclosure, and example 8 includes the subject matter of example 7, above.

The capability of second means 106 to at least one of completely or partially uncouple fiber reinforcement 220 within each of contoured charges 308 from fiber reinforcement 220 outside contoured charges 308 eliminates or reduces a need to shear or cut fibers 222 along non-impregnated outline regions 310 to remove contoured charges 308 from prepreg composite sheet 300.

Referring generally to FIGS. 1A, 1B, 2, 3, 4A, and 6, and particularly to e.g. FIGS. 5A and 5B, second means 106 for impregnating fiber reinforcement 220 with resin film layer 200 is capable of locally altering fiber reinforcement 220 with hardened portions 208 to at least one of completely or partially sever fibers 222 of fiber reinforcement 220. The preceding subject matter of this paragraph is in accordance with example 9 of the present disclosure, and example 9 includes the subject matter of example 8, above.

The capability of second means 106 to at least one of completely or partially sever fibers 222 of fiber reinforcement 220 eliminates or reduces a need to shear or cut fibers 222 along non-impregnated outline regions 310 to remove contoured charges 308 from prepreg composite sheet 300.

Referring generally to FIGS. 1A, 1B, 3, 4A, 5A, and 5B, and particularly to e.g. FIGS. 2 and 4B, system 100 further comprises fourth means 108 for separating contoured charges 308 from prepreg composite sheet 300. The preceding subject matter of this paragraph is in accordance with example 10 of the present disclosure, and example 10 includes the subject matter of any of examples 1-9, above.

The capability of fourth means 108 to separate contoured charges 308 from prepreg composite sheet 300 eliminates a need for an end user of prepreg composite sheet 300 to separate contoured charges 308 from prepreg composite sheet 300.

For example, but not by way of limitation, as prepreg composite sheet 300 is conveyed past fourth means 108, contoured charges 308 are pushed out of prepreg composite sheet 300 in direction 318, perpendicular to prepreg composite sheet 300, by fourth means 108. In some examples, prepreg composite sheet 300 is supported at its edges as it is conveyed past fourth means 108, such that contoured charges may be pushed out of prepreg composite sheet 300 into a suitable charge collection system 109, such as but not limited to a basket or conveyor belt. In one example, but not by way of limitation, fourth means 108 is operably coupled to a sensor system that is operable to locate contoured charges 308 within prepreg composite sheet 300. In another example, but not by way of limitation, the sensor system uses optical sensors to detect contoured charges 308 within prepreg composite sheet 300. In another example, but not by way of limitation, the optical sensors are configured to detect contoured charges 308 by detecting the corresponding non-impregnated outline region 310 surrounding each contoured charge 308. In another example, but not by way of limitation, the sensor system uses any suitable system to detect contoured charges 308 within prepreg composite sheet 300 that enables fourth means 108 to function as described herein.

Referring generally to FIGS. 1A, 1B, 3, 4A, 5A, and 5B, and particularly to e.g. FIGS. 2 and 4B, fourth means 108 for separating contoured charges 308 from prepreg composite sheet 300 is capable of applying a shear force to prepreg composite sheet 300. The shear force is perpendicular to prepreg composite sheet 300 and has a magnitude sufficient to overcome a friction force between at least one of the following: (i) at least one of contoured charges 308 and at least one of non-impregnated outline regions 310 corresponding to the at least one of contoured charges 308, or (ii) prepreg composite sheet 300 and at least one of non-impregnated outline regions 310 corresponding to the at least one of contoured charges 308. The preceding subject matter of this paragraph is in accordance with example 11 of the present disclosure, and example 11 includes the subject matter of example 10, above.

The capability of fourth means 108 to separate contoured charges 308 from prepreg composite sheet 300 by applying a shear force that overcomes the friction force retaining contoured charges 308 within prepreg composite sheet 300 simplifies the production of contoured charges 308.

For example, after second means 106 for impregnating fiber reinforcement 220 with resin film layer 200 causes hardened portions 208 to locally alter fiber reinforcement 220, the non-hardened resin immediately adjacent each side of each non-impregnated outline region 310 residually adheres to the hardened resin within non-impregnated outline region 310. Additionally or alternatively, the altered portion of fiber reinforcement 220 immediately adjacent each side of each non-impregnated outline region 310 interferes with non-impregnated outline region 310. These effects create a friction force that retains each contoured charge 308 within prepreg composite sheet 300. The friction force resists separation of contoured charge 308 from prepreg composite sheet 300 in direction 318 that is perpendicular to a plane defined by prepreg composite sheet 300. The friction force is therefore defined opposite to direction 318 of removal of contoured charge 308. Fourth means 108 is capable of applying the shear force with a magnitude that overcomes the friction force on at least one side of each non-impregnated outline region 310, resulting in separation of contoured charge 308 from the prepreg composite sheet 300.

Referring generally to FIGS. 1A, 1B, 3, 4A, 5A, and 5B, and particularly to e.g. FIGS. 2 and 4B, fourth means 108 for separating contoured charges 308 from prepreg composite sheet 300 is capable of applying the shear force having a magnitude of less than about twenty pounds per foot of a perimeter length of the at least one of contoured charges 308. The preceding subject matter of this paragraph is in accordance with example 12 of the present disclosure, and example 12 includes the subject matter of example 11, above.

The capability of fourth means 108 to separate contoured charges 308 from prepreg composite sheet 300 by applying a shear force that has a magnitude of less than about twenty pounds per foot of a perimeter length of the contoured charges 308 enables the separation of contoured charges 308 from prepreg composite sheet 300 in a relatively simple, safe, and inexpensive fashion, such as but not limited to pushing out contoured charges 308 by hand.

Referring generally to FIGS. 1A, 1B, 3, 4A, 5A, and 5B, and particularly to e.g. FIGS. 2 and 4B, fourth means 108 for separating contoured charges 308 from prepreg composite sheet 300 is capable of applying the shear force having a magnitude of less than about ten pounds per foot of a perimeter length of the at least one of contoured charges 308. The preceding subject matter of this paragraph is in accordance with example 13 of the present disclosure, and example 13 includes the subject matter of example 11, above.

The capability of fourth means 108 to separate contoured charges 308 from prepreg composite sheet 300 by applying a shear force that has a magnitude of less than about ten pounds per foot of a perimeter length of contoured charges 308 enables the separation of contoured charges 308 from prepreg composite sheet 300 in a relatively simple, safe, and inexpensive fashion, such as but not limited to pushing out contoured charges 308 by hand.

Referring generally to FIGS. 1A, 1B, 3, 4A, 5A, and 5B, and particularly to e.g. FIGS. 2 and 4B, fourth means 108 for separating contoured charges 308 from prepreg composite sheet 300 comprises ejecting plunger 144 configured to push the at least one of contoured charges 308 out of prepreg composite sheet 300. The preceding subject matter of this paragraph is in accordance with example 14 of the present disclosure, and example 14 includes the subject matter of any of examples 11-13, above.

Pushing out contoured charges 308 using ejecting plunger 144 enables accurate removal of contoured charges 308 with relatively simple, safe, and inexpensive equipment.

For example, but not by way of limitation, ejecting plunger 144 is a CNC device that is programmed to contact and push out contoured charges 308 from prepreg composite sheet 300.

Referring generally to FIGS. 1A, 1B, 3, 4A, 5A, and 5B, and particularly to e.g. FIGS. 2 and 4B, fourth means 108 for separating contoured charges 308 from prepreg composite sheet 300 comprises first pressurized fluid nozzle 146 configured to push at least one of contoured charges 308 out of prepreg composite sheet 300. The preceding subject matter of this paragraph is in accordance with example 15 of the present disclosure, and example 15 includes the subject matter of any of examples 11-13, above.

Pushing out contoured charges 308 using first pressurized fluid nozzle 146 enables accurate removal of contoured charges 308 with a decreased risk of physical damage to contoured charges 308, relative to ejecting plunger 144.

For example, but not by way of limitation, first pressurized fluid nozzle 146 is a CNC device that is programmed to direct fluid against contoured charges 308 to push out contoured charges 308 from prepreg composite sheet 300. For another example, but not by way of limitation, first pressurized fluid nozzle 146 is in flow communication with pressurized fluid source 131, and is operable to expel bursts of pressurized fluid to push out contoured charges 308 from prepreg composite sheet 300. For example, but not by way of limitation, pressurized fluid source 131 is a source of compressed air.

Referring generally to FIGS. 1A, 1B, 3, 4A, 5A, and 5B, and particularly to e.g. FIGS. 2 and 4B, fourth means 108 for separating contoured charges 308 from prepreg composite sheet 300 comprises vacuum nozzle 148 configured to pull the at least one of contoured charges 308 out of prepreg composite sheet 300. The preceding subject matter of this paragraph is in accordance with example 16 of the present disclosure, and example 16 includes the subject matter of example 11, above.

Pulling out contoured charges 308 using vacuum nozzle 148 enables accurate removal of contoured charges 308 with a decreased risk of physical damage to prepreg composite sheet 300, relative to ejecting plunger 144.

For example, but not by way of limitation, vacuum nozzle 148 is a CNC device that is programmed to pull out contoured charges 308 from prepreg composite sheet 300 using air suction. For another example, but not by way of limitation, vacuum nozzle 148 is in flow communication with vacuum source 133, which is operable to create a suction force to pull out fourth means 108 from prepreg composite sheet 300. For example, but not by way of limitation, vacuum source 133 is a suitable vacuum pump.

Referring generally to FIGS. 1A, 1B, 3, and 4A, and particularly to e.g. FIGS. 2, 5C, and 5D, first means 102 for forming precursor outline regions 206 is configured to form voids 212 in resin film layer 200. The preceding subject matter of this paragraph is in accordance with example 17 of the present disclosure, and example 17 includes the subject matter of any of examples 1-5, above.

The capability of first means 102 for forming precursor outline regions 206 to form voids 212 enables forming non-impregnated outline regions 310 with little or no disruption of fiber reinforcement 220.

For example, but not by way of limitation, voids 212 in resin film layer 200 substantially prevent impregnation of fiber reinforcement 220 with resin film layer 200 along precursor outline regions 206 during subsequent formation of prepreg composite sheet 300.

Referring generally to FIGS. 1A, 1B, 3, and 4A, and particularly to e.g. FIGS. 2, 5C, and 5D, first means 102 for forming precursor outline regions 206 comprises second laser 139 configured to form voids 212 in resin film layer 200. The preceding subject matter of this paragraph is in accordance with example 18 of the present disclosure, and example 18 includes the subject matter of example 17, above.

The capability of first means 102 to form voids 212 using second laser 139 enables accurate placement of precursor outline regions 206 with relatively little coarse debris.

For example, but not by way of limitation, second laser 139 is a CNC device that is programmed to direct electromagnetic energy for a predetermined time along each precursor outline region 206 to locally decompose resin film layer 200 sufficiently to form voids 212 along each precursor outline region 206. For another example, but not by way of limitation, a single laser apparatus comprises both first laser 130 and second laser 139. Alternatively, second laser 139 is a separate apparatus from first laser 130.

Referring generally to FIGS. 1A, 1B, 3, and 4A, and particularly to e.g. FIGS. 2, 5C, and 5D, first means 102 for forming precursor outline regions 206 comprises resin cutter 132 configured to form voids 212 in resin film layer 200. The preceding subject matter of this paragraph is in accordance with example 19 of the present disclosure, and example 19 includes the subject matter of example 17, above.

The capability of first means 102 to form voids 212 using resin cutter 132 enables accurate placement of precursor outline regions 206 with decreased equipment and energy costs as compared to use and maintenance of a laser-based device.

For example, but not by way of limitation, resin cutter 132 is a CNC device that is programmed to cut away resin film layer 200, such as using a drill, a blade, or another suitable cutting surface, from each precursor outline region 206 sufficiently to form voids 212 at each precursor outline region 206.

Referring generally to FIGS. 1A, 1B, 3, and 4A, and particularly to e.g. FIGS. 2 and 4B, system 100 further comprises fifth means 116 for shearing fibers 222 within at least one of non-impregnated outline regions 310. The preceding subject matter of this paragraph is in accordance with example 20 of the present disclosure, and example 20 includes the subject matter of any of examples 17-19, above.

The capability of fifth means 116 to shear fibers 222 within at least one of non-impregnated outline regions 310 eliminates a need for an end user of prepreg composite sheet 300 to cut or shear fibers 222 in order to separate contoured charges 308 from prepreg composite sheet 300.

For example, but not by way of limitation, in embodiments where precursor outline regions 206 are formed from voids 212, some of fibers 222 extend across non-impregnated outline regions 310 such that contoured charges 308 remain coupled to prepreg composite sheet 300. Fifth means 116 is capable of shearing such fibers 222 within non-impregnated outline regions 310 to facilitate separation of contoured charges 308 from prepreg composite sheet 300. For another example, but not by way of limitation, fifth means 116 is operably coupled to a sensor system that is operable to locate contoured charges 308 within prepreg composite sheet 300. For another example, but not by way of limitation, the sensor system uses optical sensors to detect contoured charges 308 within prepreg composite sheet 300. For another example, but not by way of limitation, the optical sensors are configured to detect contoured charges 308 by detecting the corresponding non-impregnated outline region 310 surrounding each contoured charge 308. For another example, but not by way of limitation, the sensor system uses any suitable system to detect contoured charges 308 within prepreg composite sheet 300 that enables fifth means 116 to function as described herein.

Referring generally to FIGS. 1A, 1B, 3, and 4A, and particularly to e.g. FIGS. 2 and 4B, fifth means 116 for shearing fibers 222 within the at least one of non-impregnated outline regions 310 is capable of applying a shear force to prepreg composite sheet 300. The shear force is perpendicular to prepreg composite sheet 300 and has a magnitude sufficient to shear fibers 222 within the at least one of non-impregnated outline regions 310. The preceding subject matter of this paragraph is in accordance with example 21 of the present disclosure, and example 21 includes the subject matter of example 20, above.

The capability of fifth means 116 to apply the shear force sufficient to shear fibers 222 within at least one of non-impregnated outline regions 310 eliminates a need for an end user of prepreg composite sheet 300 to shear or cut fibers 222 in order to separate contoured charges 308 from prepreg composite sheet 300.

Referring generally to FIGS. 1A, 1B, 3, and 4A, and particularly to e.g. FIGS. 2 and 4B, fifth means 116 for shearing fibers 222 within the at least one of non-impregnated outline regions 310 comprises shearing plunger 154. The preceding subject matter of this paragraph is in accordance with example 22 of the present disclosure, and example 22 includes the subject matter of any of examples 20 or 21, above.

Using shearing plunger 154 to enable separation of contoured charges 308 from prepreg composite sheet 300 enables automated removal of contoured charges 308.

For example, but not by way of limitation, shearing plunger 154 is a CNC device that is programmed to contact and push against contoured charges 308 in direction 318 perpendicular to prepreg composite sheet 300 with a shear force sufficient to shear fibers 222 within the at least one of non-impregnated outline regions 310.

Referring generally to FIGS. 1A, 1B, 3, and 4A, and particularly to e.g. FIGS. 2 and 4B, system 100 further comprises sixth means 118 for cutting fibers 222 within at least one of non-impregnated outline regions 310. The preceding subject matter of this paragraph is in accordance with example 23 of the present disclosure, and example 23 includes the subject matter of any of examples 17-19, above.

The capability of sixth means 118 to cut fibers 222 within at least one of non-impregnated outline regions 310 eliminates a need for an end user of prepreg composite sheet 300 to cut or shear fibers 222 in order to separate contoured charges 308 from prepreg composite sheet 300.

For example, but not by way of limitation, in embodiments where precursor outline regions 206 are formed from voids 212, some of fibers 222 extend across non-impregnated outline regions 310 such that contoured charges 308 remain coupled to prepreg composite sheet 300. Sixth means 118 is capable of cutting such fibers 222 within non-impregnated outline regions 310 to facilitate separation of contoured charges 308 from prepreg composite sheet 300. For another example, but not by way of limitation, sixth means 118 is operably coupled to a sensor system that is operable to locate contoured charges 308 within prepreg composite sheet 300. For another example, but not by way of limitation, the sensor system uses optical sensors to detect contoured charges 308 within prepreg composite sheet 300. For another example, but not by way of limitation, the optical sensors are configured to detect contoured charges 308 by detecting the corresponding non-impregnated outline region 310 surrounding each contoured charge 308. For another example, but not by way of limitation, the sensor system uses any suitable system to detect contoured charges 308 within prepreg composite sheet 300 that enables sixth means 118 to function as described herein.

Referring generally to FIGS. 1A, 1B, 3, and 4A, and particularly to e.g. FIGS. 2 and 4B, sixth means 118 for cutting fibers 222 within the at least one of non-impregnated outline regions 310 comprises fiber cutter 152. The preceding subject matter of this paragraph is in accordance with example 24 of the present disclosure, and example 24 includes the subject matter of example 23, above.

Fiber cutter 152 enables accurate cutting of fibers 222 within the at least one of non-impregnated outline regions 310.

For example, but not by way of limitation, fiber cutter 152 is a CNC device that is programmed to cut fibers 222, such as using a drill, a blade, or another suitable cutting surface, along the at least one non-impregnated outline region 310.

Referring generally to FIGS. 1A, 1B, 3, and 4A, and particularly to e.g. FIGS. 2 and 4B, sixth means 118 for cutting fibers 222 within the at least one of non-impregnated outline regions 310 comprises second pressurized fluid nozzle 156. The preceding subject matter of this paragraph is in accordance with example 25 of the present disclosure, and example 25 includes the subject matter of example 23, above.

Second pressurized fluid nozzle 156 enables accurate cutting of fibers 222 within the at least one of non-impregnated outline regions 310.

For example, but not by way of limitation, second pressurized fluid nozzle 156 is a CNC device that is programmed to cut fibers 222 along the at least one non-impregnated outline region 310. For another example, but not by way of limitation, second pressurized fluid nozzle 156 is in flow communication with pressurized fluid source 131, and is operable to expel bursts of pressurized fluid to cut fibers 222 along the at least one non-impregnated outline region 310.

For example, but not by way of limitation, pressurized fluid source 131 is a source of pressurized water.

Referring generally to FIGS. 1A and 1B, and particularly to e.g. FIGS. 2 and 4A, system 100 further comprises seventh means 112 for separating prepreg composite sheet 300 into sub-sheets 302. Each of sub-sheets 302 contains at least one of contoured charges 308. The preceding subject matter of this paragraph is in accordance with example 26 of the present disclosure, and example 26 includes the subject matter of any of examples 1-10 or 17-19, above.

Seventh means 112 enables prepreg composite sheet 300 including contoured charges 308 to be bundled, for example in bundle 322 of sub-sheets 302, and delivered to an end user in a flat configuration.

In certain embodiments, system 100 does not include any of fourth means 108 for separating contoured charges 308 from prepreg composite sheet 300, fifth means 116 for shearing fibers 222 within at least one of non-impregnated outline regions 310, and sixth means 118 for cutting fibers 222 within at least one of non-impregnated outline regions 310. For example, but not by way of limitation, in embodiments where non-impregnated outline regions 310 are formed from voids 212, prepreg composite sheet 300 including contoured charges 308 is collected on spindle 110 and delivered to an end user in rolled configuration 320, or collected and delivered in bundle 322 of sub-sheets 302, and the end user cuts fibers 222 along non-impregnated outline regions 310 to separate contoured charges 308 from prepreg composite sheet 300. For another example, but not by way of limitation, in embodiments where non-impregnated outline regions 310 are formed from hardened portions 208, prepreg composite sheet 300 including contoured charges 308 is collected and delivered to an end user as bundle 322 of sub-sheets 302, and the end user separates contoured charges 308 from sub-sheets 302 by applying a shear force that overcomes the relatively small friction force retaining contoured charges 308 within prepreg composite sheet 300, such as but not limited to by pushing out contoured charges 308 by hand. It should be noted that in embodiments where non-impregnated outline regions 310 are formed from hardened portions 208, collection of prepreg composite sheet 300 including contoured charges 308 in rolled configuration 320 is difficult because hardened portions 208 resist deformation from their as-formed planar configuration.

Referring generally to FIGS. 1A, 1B, 2, 3, and 4A, and particularly to e.g. FIGS. 10A and 10B (blocks 1002 and 1004), method 1000 of making prepreg composite sheet 300 comprising contoured charges 308 is disclosed. The method comprises forming precursor outline regions 206 in resin film layer 200. Resin film layer 200 has a viscosity. The method also comprises impregnating fiber reinforcement 220 having fibers 222 with resin film layer 200 to form non-impregnated outline regions 310. Non-impregnated outline regions 310 define contoured charges 308 in prepreg composite sheet 300. Non-impregnated outline regions 310 correspond to precursor outline regions 206 in resin film layer 200. The preceding subject matter of this paragraph is in accordance with example 27 of the present disclosure.

Making prepreg composite sheet 300 comprising contoured charges 308, such as by a supplier of prepreg sheet material, relieves an end user of prepreg composite sheet 300, such as a manufacturer of a laminate composite article, of the task of mapping charges on the prepreg composite sheet, and in some embodiments of the task of cutting the charges from the prepreg composite sheet, thereby reducing a manufacturing cycle time, equipment cost, and labor burden on the end user.

Referring generally to FIGS. 1A, 1B, 2, 3, 4A, 5A, and 5B, and particularly to e.g. FIGS. 10A and 10B (block 1006), forming precursor outline regions 206 in resin film layer 200 comprises forming hardened portions 208 in resin film layer 200 by locally curing resin film layer 200. The preceding subject matter of this paragraph is in accordance with example 28 of the present disclosure, and example 28 includes the subject matter of example 27, above.

Forming hardened portions 208 by locally curing resin film layer 200 enables accurate placement of precursor outline regions 206, and enables formation of precursor outline regions 206 with little or no debris.

Referring generally to FIGS. 1A, 1B, 2, 3, 4A, 5A, and 5B, and particularly to e.g. FIGS. 10A and 10B (block 1008), locally curing resin film layer 200 comprises locally irradiating resin film layer 200 with electromagnetic energy. The preceding subject matter of this paragraph is in accordance with example 29 of the present disclosure, and example 29 includes the subject matter of example 28, above.

Locally curing resin film layer 200 by locally irradiating resin film layer 200 with electromagnetic energy enables accurate placement of precursor outline regions 206, and enables formation of precursor outline regions 206 with little or no debris.

For example, but not by way of limitation, resin film layer 200 is locally irradiated with electromagnetic energy by first laser 130 for a predetermined time along each precursor outline region 206 to locally cure resin film layer 200 sufficiently to form hardened portions 208 of resin along each precursor outline region 206.

Referring generally to FIGS. 1A, 1B, 2, 3, 4A, 5A, and 5B, and particularly to e.g. FIGS. 10A and 10B (block 1010), impregnating fiber reinforcement 220 with resin film layer 200 further comprises locally altering fiber reinforcement 220 with hardened portions 208. The preceding subject matter of this paragraph is in accordance with example 30 of the present disclosure, and example 30 includes the subject matter of any of examples 28 or 29, above.

Locally altering fiber reinforcement 220 with hardened portions 208 pushes fibers 222 out of non-impregnated outline regions 310 during formation of prepreg composite sheet 300 with little or no debris, and eliminates or reduces a need in a later method step to cut or shear fibers 222 that cross non-impregnated outline regions 310.

For example, but not by way of limitation, second means 106 forces fiber reinforcement 220 and resin film layer 200 together under pressure, such as using calendaring rollers 120, causing hardened portions 208 to alter fiber reinforcement 220. For another example, but not by way of limitation, fibers 222 of fiber reinforcement 220 are locally displaced within prepreg composite sheet 300 by hardened portions 208. For another example, but not by way of limitation, hardened portions 208 become lodged within fiber reinforcement 220 and substantially prevent impregnation of fiber reinforcement 220 with resin film layer 200 along non-impregnated outline regions 310.

Referring generally to FIGS. 1A, 1B, 2, 3, 4A, 5A, and 5B, and particularly to e.g. FIGS. 10A and 10B (block 1012), locally altering fiber reinforcement 220 with hardened portions 208 comprises at least one of completely or partially uncoupling fiber reinforcement 220 within each of contoured charges 308 from fiber reinforcement 220 outside contoured charges 308. The preceding subject matter of this paragraph is in accordance with example 31 of the present disclosure, and example 31 includes the subject matter of example 30, above.

Completely or partially uncoupling fiber reinforcement 220 within each of contoured charges 308 from fiber reinforcement 220 outside contoured charges 308 during formation of prepreg composite sheet 300 eliminates or reduces a need in a later method step to cut or shear fibers 222 that cross non-impregnated outline regions 310.

For example, but not by way of limitation, second means 106 forces fiber reinforcement 220 and resin film layer 200 together under pressure, such as using calendaring rollers 120, causing hardened portions 208 of resin film layer 200 to completely or partially uncouple fibers 222 of fiber reinforcement 220 that extend across non-impregnated outline regions 310.

Referring generally to FIGS. 1A, 1B, 2, 3, 4A, 5A, and 5B, and particularly to e.g. FIGS. 10A and 10B (block 1014), locally altering fiber reinforcement 220 with hardened portions 208 comprises at least one of completely or partially severing fibers 222 of fiber reinforcement 220 with hardened portions 208. The preceding subject matter of this paragraph is in accordance with example 32 of the present disclosure, and example 32 includes the subject matter of any of examples 30 or 31, above.

Completely or partially severing fibers 222 of fiber reinforcement 220 during formation of prepreg composite sheet 300 eliminates or reduces a need in a later method step to cut or shear fibers 222 that cross non-impregnated outline regions 310.

For example, but not by way of limitation, second means 106 forces fiber reinforcement 220 and resin film layer 200 together under pressure, such as using calendaring rollers 120, causing hardened portions 208 of resin film layer 200 to completely or partially sever at least some of fibers 222 of fiber reinforcement 220 that extend across non-impregnated outline regions 310.

Referring generally to FIGS. 1A, 1B, 2, 3, 4A, 4B, 5A, and 5B, and particularly to e.g. FIGS. 10A and 10B, each contoured charge 308 is separable from prepreg composite sheet 300 by applying a shear force to prepreg composite sheet 300. The shear force is perpendicular to prepreg composite sheet 300 and has a magnitude sufficient to overcome a friction force between at least one of the following: (i) at least one of contoured charges 308 and at least one of non-impregnated outline regions 310 corresponding to the at least one of contoured charges 308, or (ii) prepreg composite sheet 300 and at least one of non-impregnated outline regions 310 corresponding to the at least one of contoured charges 308. The preceding subject matter of this paragraph is in accordance with example 33 of the present disclosure, and example 33 includes the subject matter of any of examples 28-32, above.

Forming prepreg composite sheet 300 comprising contoured charges 308 that are separate from prepreg composite sheet 300 by applying a shear force that overcomes the friction force retaining contoured charges 308 within prepreg composite sheet 300 simplifies the production of contoured charges 308.

Referring generally to FIGS. 1A, 1B, 2, 3, 4A, 4B, 5A, and 5B, and particularly to e.g. FIGS. 10A and 10B, each of contoured charges 308 is separable from prepreg composite sheet 300 by applying the shear force having a magnitude of less than about twenty pounds per foot of a perimeter length of the at least one of contoured charges 308. The preceding subject matter of this paragraph is in accordance with example 34 of the present disclosure, and example 34 includes the subject matter of example 33, above.

Forming prepreg composite sheet 300 comprising contoured charges 308 that are separate from prepreg composite sheet 300 by applying a shear force that has a magnitude of less than about twenty pounds per foot of a perimeter length of contoured charges 308 enables the separation of contoured charges 308 from prepreg composite sheet 300 in a relatively simple, safe, and inexpensive fashion, such as but not limited to pushing out contoured charges 308 by hand.

Referring generally to FIGS. 1A, 1B, 2, 3, 4A, 4B, 5A, and 5B, and particularly to e.g. FIGS. 10A and 10B, each of contoured charges 308 is separable from prepreg composite sheet 300 by applying the shear force having a magnitude of less than about ten pounds per foot of a perimeter length of the at least one of contoured charges 308. The preceding subject matter of this paragraph is in accordance with example 35 of the present disclosure, and example 35 includes the subject matter of example 33, above.

Forming prepreg composite sheet 300 comprising contoured charges 308 that are separate from prepreg composite sheet 300 by applying a shear force that has a magnitude of less than about ten pounds per foot of a perimeter length of contoured charges 308 enables the separation of contoured charges 308 from prepreg composite sheet 300 in a relatively simple, safe, and inexpensive fashion, such as but not limited to pushing out contoured charges 308 by hand.

Referring generally to FIGS. 1A, 1B, 2, 3, 4A, 5C, and 5D, and particularly to e.g. FIGS. 10A and 10B (block 1016), forming precursor outline regions 206 in resin film layer 200 comprises forming voids 212 in resin film layer 200. Each of voids 212 has width 216. The preceding subject matter of this paragraph is in accordance with example 36 of the present disclosure, and example 36 includes the subject matter of example 27, above.

Forming precursor outline regions 206 by forming voids 212 enables forming non-impregnated outline regions 310 with little or no disruption of fiber reinforcement 220.

Referring generally to FIGS. 1A, 1B, 2, 3, 4A, 5C, and 5D, and particularly to e.g. FIGS. 10A and 10B (block 1018), forming voids 212 in resin film layer 200 comprises forming at least one of voids 212 as a closed shape. The preceding subject matter of this paragraph is in accordance with example 37 of the present disclosure, and example 37 includes the subject matter of example 36, above.

Forming at least one of voids 212 as a closed shape results in a corresponding non-impregnated outline region 310 with the closed shape, thereby defining a contiguous contoured charge 308 within prepreg composite sheet 300 that has a perimeter defined by the corresponding non-impregnated outline region 310.

Referring generally to FIGS. 1A, 1B, 2, 3, 4A, 5C, and 5D, and particularly to e.g. FIGS. 10A and 10B (block 1020), impregnating fiber reinforcement 220 with resin film layer 200 comprises compressing resin film layer 200 to shrink width 216 of each of voids 212. Width 216 of each of voids 212 is selected such that width 216 remains greater than zero after resin film layer 200 is compressed. The preceding subject matter of this paragraph is in accordance with example 38 of the present disclosure, and example 38 includes the subject matter of any of examples 36 or 37, above.

Compressing resin film layer 200 to shrink width 216 of each of voids 212 such that width 216 remains greater than zero after compression enables non-impregnated outline regions 310 of prepreg composite sheet 300 to be formed with a predetermined width.

For example, but not by way of limitation, each void 212 comprises a contoured closed line in resin film layer 200, with a boundary on each side of the contoured line formed by resin adjacent void 212. Calendaring rollers 120 compress resin film layer 200, thereby forcing resin film layer 200 inward from the boundaries towards a centerline of each void 212. The resulting post-compression boundaries of each void 212 define the size of the corresponding non-impregnated outline region 310 in prepreg composite sheet 300. For example, but not by way of limitation, an amount of the shrinkage can be determined at least one of theoretically and experimentally, and a width of voids 212 can be selected to generate the predetermined size of non-impregnated outline regions 310 of prepreg composite sheet 300.

Referring generally to FIGS. 1A, 1B, 2, 3, 4A, 5C, and 5D, and particularly to e.g. FIGS. 10A and 10B (block 1022), forming voids 212 in resin film layer 200 comprises locally decomposing resin film layer 200. The preceding subject matter of this paragraph is in accordance with example 39 of the present disclosure, and example 39 includes the subject matter of any of examples 36-38, above.

Forming voids 212 by locally decomposing resin film layer 200 enables formation of precursor outline regions 206 with little or no coarse debris.

Referring generally to FIGS. 1A, 1B, 2, 3, 4A, 5C, and 5D, and particularly to e.g. FIGS. 10A and 10B (block 1024), locally decomposing resin film layer 200 to form voids 212 comprises locally burning away resin film layer 200. The preceding subject matter of this paragraph is in accordance with example 40 of the present disclosure, and example 40 includes the subject matter of example 39, above.

Forming voids 212 by locally burning away resin film layer 200 enables formation of precursor outline regions 206 with little or no debris.

Referring generally to FIGS. 1A, 1B, 2, 3, 4A, 5C, and 5D, and particularly to e.g. FIGS. 10A and 10B (block 1026), locally burning away resin film layer 200 comprises locally irradiating resin film layer 200 with electromagnetic energy. The preceding subject matter of this paragraph is in accordance with example 41 of the present disclosure, and example 41 includes the subject matter of example 40, above.

Forming voids 212 by locally irradiating resin film layer 200 with electromagnetic energy enables formation of precursor outline regions 206 with little or no debris.

For example, but not by way of limitation, second laser 139 is used to direct electromagnetic energy for a predetermined time at each precursor outline region 206 to locally decompose resin film layer 200 sufficiently to form voids 212 along each precursor outline region 206.

Referring generally to FIGS. 1A, 1B, 2, 3, 4A, 5C, and 5D, and particularly to e.g. FIGS. 10A and 10B (block 1028), forming voids 212 in resin film layer 200 comprises cutting away portions of resin film layer 200. The preceding subject matter of this paragraph is in accordance with example 42 of the present disclosure, and example 42 includes the subject matter of any of examples 36 or 37, above.

Cutting away portions of resin film layer 200 enables formation of precursor outline regions 206 with decreased equipment and energy costs as compared to forming precursor outline regions 206 using electromagnetic energy.

For example, but not by way of limitation, portions of resin film layer 200 are cut away using resin cutter 132 to form voids 212 at each precursor outline region 206.

Referring generally to FIGS. 1A, 1B, 2, 3, 4A, 4B, 5C, and 5D, and particularly to e.g. FIGS. 10A and 10B, each of contoured charges 308 is separable from prepreg composite sheet 300 by applying a shear force to prepreg composite sheet 300. The shear force is perpendicular to prepreg composite sheet 300 and has a magnitude sufficient to shear fibers 222 within at least one of non-impregnated outline regions 310. The preceding subject matter of this paragraph is in accordance with example 43 of the present disclosure, and example 43 includes the subject matter of any of examples 36-42, above.

Forming prepreg composite sheet 300 comprising contoured charges 308 that are separate from prepreg composite sheet 300 by applying a shear force that has a magnitude sufficient to shear fibers 222 within at least one of non-impregnated outline regions 310 enables automated separation of contoured charges 308 from prepreg composite sheet 300, thereby eliminating a need for an end user of prepreg composite sheet 300 to shear or cut fibers 222 in order to separate contoured charges 308 from prepreg composite sheet 300.

For example, but not by way of limitation, in embodiments where precursor outline regions 206 are formed from voids 212, some of fibers 222 extend across non-impregnated outline regions 310 such that contoured charges 308 remain coupled to prepreg composite sheet 300. In some embodiments, prepreg composite sheet 300 is conveyed past fifth means 116, which shears fibers 222 to enable separation of contoured charges 308 from prepreg composite sheet 300.

Referring generally to FIGS. 1A, 1B, 2, 3, 4A, 4B, 5A, and 5B, and particularly to e.g. FIGS. 10A and 10B, contoured charges 308 are separable from prepreg composite sheet 300 by cutting fibers 222 within non-impregnated outline regions 310 corresponding to contoured charges 308. The preceding subject matter of this paragraph is in accordance with example 44 of the present disclosure, and example 44 includes the subject matter of any of examples 36-42, above.

Forming prepreg composite sheet 300 comprising contoured charges 308 that are separate from prepreg composite sheet 300 by cutting fibers 222 within at least one of non-impregnated outline regions 310 enables separation of contoured charges 308 from prepreg composite sheet 300 either in automated fashion after prepreg composite sheet 300 is formed, or by hand by an end user of prepreg composite sheet 300.

For example, but not by way of limitation, in embodiments where precursor outline regions 206 are formed from voids 212, some of fibers 222 extend across non-impregnated outline regions 310 such that contoured charges 308 remain coupled to prepreg composite sheet 300. In some embodiments, prepreg composite sheet 300 is conveyed past sixth means 118, and sixth means 118 cuts fibers 222 within at least one of non-impregnated outline regions 310 to enable separation of the corresponding contoured charge 308 from prepreg composite sheet 300. Alternatively, an end user of prepreg composite sheet 300 cuts along non-impregnated outline regions 310 using, for example, a manual or power cutting tool to enable separation of contoured charges 308 from prepreg composite sheet 300.

Referring generally to FIGS. 1A, 1B, 2, 3, 4A, 7A, 7B, 8, and 9, and particularly to e.g. FIGS. 10A and 10B (block 1030), forming precursor outline regions 206 in resin film layer 200 further comprises forming precursor outline regions 206 to correspond in shape to layers 710 of laminated precursor article 700 to be formed from contoured charges 308. The preceding subject matter of this paragraph is in accordance with example 45 of the present disclosure, and example 45 includes the subject matter of any of examples 27-44, above.

Forming precursor outline regions 206 to correspond in shape to layers 710 of laminated precursor article 700 renders contoured charges 308 ready for use in manufacturing laminated precursor article 700 without a need for additional pre-shaping of contoured charges 308 by the manufacturer.

Referring generally to FIGS. 1A, 1B, 2, 3, 4A, 6, 7A, 7B, 8, and 9, and particularly to e.g. FIGS. 10A and 10B (blocks 1032 and 1034), layers 710 of laminated precursor article 700 have predetermined ideal orientation directions 702 of fibers 222 within laminated precursor article 700. The method further comprises orienting fibers 222 of fiber reinforcement 220 along longitudinal direction 314 of prepreg composite sheet 300, and orienting contoured charges 308 at angles 312 relative to longitudinal direction 314 of prepreg composite sheet 300. Each of angles 312 corresponds to one of predetermined ideal orientation directions 702 of fibers 222 within laminated precursor article 700. The preceding subject matter of this paragraph is in accordance with example 46 of the present disclosure, and example 46 includes the subject matter of example 45, above.

Orienting contoured charges 308 at angles 312 that correspond to predetermined ideal orientation directions 702 of fibers 222 within layers 710 of laminated precursor article 700 renders contoured charges 308 ready for use in manufacturing laminated precursor article 700 without a need for additional pre-shaping of contoured charges 308 by the manufacturer.

For example, but without limitation, a contoured charge-based reference axis 324 can be defined with respect to the shape of non-impregnated outline regions 310. In the illustrated example, reference axis 324 is defined parallel to a longest straight edge of the shape of contoured charges 308. However, it should be understood that reference axis 324 may be defined based on any suitable feature or combination of features of the shape of contoured charges 308. For each contoured charge 308, angle 312 is defined as the angle between longitudinal direction 314 and reference axis 324. Similarly, for each layer 710 of laminated precursor article 700, predetermined ideal orientation direction 702 is defined between the ideal orientation direction of layer 710 and reference axis 324.

Referring generally to FIGS. 1A, 1B, 2, 3, 4A, 6, 7A, 7B, 8, and 9, and particularly to e.g. FIGS. 10A and 10B (block 1036), orienting contoured charges 308 at angles 312 relative to longitudinal direction 314 of prepreg composite sheet 300 comprises selecting at least two of angles 312 to have different measures relative to longitudinal direction 314 of prepreg composite sheet 300. The preceding subject matter of this paragraph is in accordance with example 47 of the present disclosure, and example 47 includes the subject matter of example 46, above.

Selecting at least two of angles 312 to have different measures relative to longitudinal direction 314 of prepreg composite sheet 300 enables contoured charges 308 to be differently oriented on prepreg composite sheet 300 such that contoured charges 308 are formed with at least two predetermined fiber directions needed to form layers 710 of laminated precursor article 700.

For example, but without limitation, in the illustrated example, derivative article 800 includes four layers 900 corresponding to layers 710 of laminated precursor article 700. Layers 710 have respective predetermined ideal orientation directions 702 of 90 degrees, −45 degrees, 45 degrees, and 0 degrees. Angles 312 are correspondingly selected to be one of 90 degrees, −45 degrees, 45 degrees, and 0 degrees. Although only four layers and four non-repeating predetermined ideal orientation directions 702 are illustrated, it should be understood that laminated precursor article 700 may have any desired number of layers 710 stacked in any suitable repeating or non-repeating pattern of predetermined ideal orientation directions 702, and each contoured charge 308 may be oriented at any of angles 312 corresponding to predetermined ideal orientation directions 702.

Referring generally to FIGS. 1A, 1B, 2, 3, 4A, 6, 7A, 7B, 8, and 9, and particularly to e.g. FIGS. 10A and 10B (block 1038), method 1000 further comprises forming tags 316 on contoured charges 308. Each of tags 316 corresponds to one of layers 710 of laminated precursor article 700 to be formed of one of contoured charges 308. The preceding subject matter of this paragraph is in accordance with example 48 of the present disclosure, and example 48 includes the subject matter of any of examples 45-47, above.

Including tags 316 on contoured charges 308 increases an ease of stacking contoured charges 308 in proper order to form layers 710 of laminated precursor article 700. Additionally or alternatively, including tags on contoured charges 308 facilitates ensuring that the correct contoured charges 308 are used to make a given derivative article 800. For example, but not by way of limitation, each tag 316 additionally identifies at least one of a material used to form the associated prepreg composite sheet 300, a batch number or other information associated with the location and time of manufacture of the associated prepreg composite sheet 300, derivative article 800 for the manufacture of which the associated contoured charge 308 was intended, a serial number of the associated contoured charge 308, and other suitable identification information associated with contoured charge 308 and/or prepreg composite sheet 300.

For example, but not by way of limitation, tag 316 includes one or more of a UPC barcode, a 2D barcode, another suitable barcode, plain text, and another suitable form of identifier for contoured charges 308.

Referring generally to FIGS. 1A, 1B, 2, 3, 4A, 6, 7A, 7B, 8, and 9, and particularly to e.g. FIGS. 10A and 10B (block 1040), forming tags 316 on contoured charges 308 comprises printing tags 316 on backing material 210 coupled to prepreg composite sheet 300. The preceding subject matter of this paragraph is in accordance with example 49 of the present disclosure, and example 49 includes the subject matter of example 48, above.

Printing tags 316 on backing material 210 enables tags 316 to be associated with contoured charges 308 without alteration to a structure of contoured charges 308. Additionally, printing tags 316 on backing material 210 enables backing material 210 to be retained as a quality record or receipt that documents, for example, details of contoured charges 308 included in each derivative article 800.

For example, but not by way of limitation, backing material 210 is initially coupled to resin film layer 200 to facilitate handling of resin film layer 200 by third means 104 for guiding fiber reinforcement 220 and resin film layer 200. For example, but not by way of limitation, backing material 210 remains coupled to prepreg composite sheet 300 as it is formed from resin film layer 200 and fiber reinforcement 220, to facilitate handling of prepreg composite sheet 300 by system 100, and to facilitate packaging of prepreg composite sheet 300 for shipment and storage, such as in rolled configuration 320. Alternatively or additionally, a separate backing material, not shown, is coupled to prepreg composite sheet 300 after prepreg composite sheet 300 is formed. For example, but not by way of limitation, backing material 210 remains coupled to contoured charges 308 as they are separated from prepreg composite sheet 300, to facilitate handling of contoured charges 308 by an end user. For example, but not by way of limitation, backing material 210 is peeled or otherwise removed from each contoured charge 308 just prior to stacking it as layer 710 of laminated precursor article 700.

Referring generally to FIGS. 1A, 1B, 2, 3, 4A, 6, 7A, 7B, 8, and 9, and particularly to e.g. FIGS. 10A and 10B (block 1042), forming tags 316 on contoured charges 308 comprises forming tags 316 in prepreg composite sheet 300. The preceding subject matter of this paragraph is in accordance with example 50 of the present disclosure, and example 50 includes the subject matter of example 48, above.

Forming tags 316 on contoured charges 308 enables tags 316 to be associated with contoured charges 308 in applications where backing material 210 is not present or not printable, or after removal of backing material 210.

Referring generally to FIGS. 1A, 1B, 2, 3, 4A, 6, 7A, 7B, 8, and 9, and particularly to e.g. FIGS. 10A and 10B (block 1044), forming tags 316 in prepreg composite sheet 300 comprises stamping tags 316 into prepreg composite sheet 300. The preceding subject matter of this paragraph is in accordance with example 51 of the present disclosure, and example 51 includes the subject matter of example 50, above.

Stamping tags 316 on contoured charges 308 enables tags 316 to be associated with contoured charges 308 in applications where backing material 210 is not present or not printable, or after removal of backing material 210.

Referring generally to FIGS. 1A, 1B, 2, 3, 4A, 6, 7A, 7B, 8, and 9, and particularly to e.g. FIGS. 10A and 10B (block 1046), forming tags 316 in prepreg composite sheet 300 comprises locally decomposing prepreg composite sheet 300. The preceding subject matter of this paragraph is in accordance with example 52 of the present disclosure, and example 52 includes the subject matter of example 50, above.

Forming tags 316 on contoured charges 308 by locally decomposing prepreg composite sheet 300 enables tags 316 to be associated with contoured charges 308 in applications where backing material 210 is not present or not printable, or after removal of backing material 210.

Referring generally to FIGS. 1A, 1B, 2, 3, 4A, 6, 7A, 7B, 8, and 9, and particularly to e.g. FIGS. 10A and 10B (block 1048), locally decomposing prepreg composite sheet 300 comprises locally burning away prepreg composite sheet 300. The preceding subject matter of this paragraph is in accordance with example 53 of the present disclosure, and example 53 includes the subject matter of example 52, above.

Forming tags 316 on contoured charges 308 by locally burning away prepreg composite sheet 300 enables tags 316 to be associated with contoured charges 308 in applications where backing material 210 is not present or not printable, or after removal of backing material 210.

Referring generally to FIGS. 1A, 1B, 2, 3, 4A, 6, 7A, 7B, 8, and 9, and particularly to e.g. FIGS. 10A and 10B (block 1050), locally burning away prepreg composite sheet 300 comprises locally irradiating prepreg composite sheet 300 with electromagnetic energy. The preceding subject matter of this paragraph is in accordance with example 54 of the present disclosure, and example 54 includes the subject matter of example 53, above.

Locally burning away prepreg composite sheet 300 by locally irradiating prepreg composite sheet 300 enables tags 316 to be associated with contoured charges 308 in applications where backing material 210 is not present or not printable, or after removal of backing material 210.

For example, but not by way of limitation, a laser not shown similar to first laser 130 is used to form tags 316 by locally irradiating prepreg composite sheet 300.

Referring generally to FIGS. 1A, 1B, 2, 3, 4A, 6, 7A, 7B, 8, and 9, and particularly to e.g. FIGS. 10A and 10B (block 1052), forming tags 316 in prepreg composite sheet 300 comprises cutting tags 316 into prepreg composite sheet 300. The preceding subject matter of this paragraph is in accordance with example 55 of the present disclosure, and example 55 includes the subject matter of example 50, above.

Cutting tags 316 into prepreg composite sheet 300 enables tags 316 to be associated with contoured charges 308 in applications where backing material 210 is not present or not printable, or after removal of backing material 210.

Referring generally to FIGS. 1A, 1B, 2, 3, 4A, 6, 7A, 7B, 8, and 9, and particularly to e.g. FIGS. 10A and 10B (block 1054), the method 1000 further comprises forming each of tags 316 on each of contoured charges 308 outside virtual boundary 704 on a surface of each of contoured charges 308. Virtual boundary 704 of each of contoured charges 308 corresponds in shape to lamina 804 of derivative article 800 to be formed from laminated precursor article 700. The preceding subject matter of this paragraph is in accordance with example 56 of the present disclosure, and example 56 includes the subject matter of any of examples 48-55, above.

Forming tags 316 potentially introduces regions of compromised integrity of fiber reinforcement 220. For example, but not by way of limitation, each of stamping and cutting tags 316 into prepreg composite sheet 300 displaces or breaks fibers 222 adjacent each tag 316. For example, but not by way of limitation, forming tags 316 by at least one of locally decomposing, locally burning away, and locally irradiating prepreg composite sheet 300 displaces fibers 222 adjacent each tag 316. Locating tags 316 outside virtual boundary 704 reduces or eliminates a potential for such regions of compromised integrity of fiber reinforcement 220 to be included within derivative article 800.

As used herein, "virtual" means having the attributes of a feature without possessing its physical form. For instance, a virtual reference plane is an intangible or imaginary rather than a physical plane with respect to which, e.g., location and/or orientation of other physical and/or intangible entities may be defined. For example, but not by way of limitation, virtual boundary 704 defines at least one line along which laminated precursor article 700 will be trimmed to form derivative article 800, such that tags 316 lie on portions of laminated precursor article 700 that will be trimmed away to form derivative article 800.

Examples of the present disclosure may be described in the context of aircraft manufacturing and service method 1100 as shown in FIG. 11 and aircraft 1102 as shown in FIG. 12. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 12, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples presented and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

What is claimed is:

1. A system for making contoured charges, the system comprising:
    first means for locally curing a resin film layer to form hardened portions extending along precursor outline regions through the resin film layer such that the hardened portions are bounded by uncured portions of the resin film layer inside and outside the precursor outline regions;
    second means for impregnating a fiber reinforcement, comprising fibers, with the resin film layer to form a prepreg composite sheet such that the hardened portions of the resin film layer define nonimpregnated outline regions that define the contoured charges, wherein the second means is configured to cause the hardened portions to at least partially uncouple the fiber reinforcement within the contoured charges from the fiber reinforcement outside the contoured charges;
    third means for guiding the fiber reinforcement and the resin film layer, comprising the precursor outline regions formed by the first means, to the second means; and
    fourth means for separating the contoured charges from the prepreg composite sheet, the fourth means capable of applying a shear force to the prepreg composite sheet and comprising one of a first pressurized fluid nozzle configured to push at least one of the contoured charges out of the prepreg composite sheet and a vacuum nozzle configured to pull the at least one of the contoured charges out of the prepreg composite sheet, wherein the shear force is perpendicular to the prepreg composite sheet and has a magnitude sufficient to overcome a friction force between at least one of the following:
    (i) at least one of the contoured charges and at least one of the nonimpregnated outline regions corresponding to the at least one of the contoured charges, or
    (ii) the prepreg composite sheet and at least one of the nonimpregnated outline regions corresponding to the at least one of the contoured charges.

2. The system according to claim 1, wherein the fourth means for separating the contoured charges from the prepreg composite sheet is capable of applying the shear force having a magnitude of less than about twenty pounds per foot of a perimeter length of the at least one of the contoured charges.

3. The system according to claim 1, wherein the fourth means for separating the contoured charges from the prepreg composite sheet is capable of applying the shear force having a magnitude of less than about ten pounds per foot of a perimeter length of the at least one of the contoured charges.

4. The system according to claim 1, wherein the second means for impregnating a fiber reinforcement with the resin film layer comprises at least two calendaring rollers.

5. The system according to claim 4, wherein the second means for impregnating the fiber reinforcement with the resin film layer further comprises a first heating system configured to heat at least one of the at least two calendaring rollers.

6. The system according to claim 5, wherein the first heating system is internal to at least one of the at least two calendaring rollers.

7. The system according to claim 5, wherein the second means for impregnating the fiber reinforcement with the resin film layer further comprises a second heating system external to the at least two calendaring rollers.

8. The system according to claim 1, wherein the first means for forming precursor outline regions comprises a first laser configured to form hardened portions by locally curing the resin film layer.

9. The system according to claim 1, wherein the second means for impregnating the fiber reinforcement with the resin film layer is capable of locally altering the fiber reinforcement with the hardened portions to at least one of completely or partially sever the fibers of the fiber reinforcement.

10. A system for making a prepreg composite sheet comprising contoured charges, the system comprising:
a first means for forming voids in a resin film layer;
second means for impregnating a fiber reinforcement, comprising fibers, with the resin film layer to form the prepreg composite sheet such that the voids in the resin film layer define nonimpregnated outline regions that define the contoured charges, and such that the fiber reinforcement extends through the nonimpregnated outline regions;
third means for guiding the fiber reinforcement and the resin film layer, comprising the voids formed by the first means, to the second means; and
at least one means configured to sever the fiber reinforcement along the nonimpregnated outline regions such that the fiber reinforcement within the contoured charges is substantially uncoupled from the fiber reinforcement outside the contoured charges.

11. The system according to claim 10, wherein the at least one means configured to sever the fiber reinforcement comprises fifth means for shearing the fibers within at least one of the nonimpregnated outline regions.

12. The system according to claim 11, wherein the fifth means for shearing the fibers within the at least one of the nonimpregnated outline regions is capable of applying a shear force to the prepreg composite sheet, wherein the shear force is perpendicular to the prepreg composite sheet and has a magnitude sufficient to shear the fibers within the at least one of the nonimpregnated outline regions.

13. The system according to claim 11, wherein the fifth means for shearing the fibers within the at least one of the nonimpregnated outline regions comprises a shearing plunger.

14. The system according to claim 10, wherein the at least one means configured to sever the fiber reinforcement comprises sixth means for cutting the fibers within at least one of the nonimpregnated outline regions.

15. The system according to claim 14, wherein the sixth means for cutting the fibers within the at least one of the non-impregnated outline regions comprises a fiber cutter.

16. The system according to claim 14, wherein the sixth means for cutting the fibers within the at least one of the non-impregnated outline regions comprises a second pressurized fluid nozzle.

17. The system according to claim 10, wherein the first means for forming voids comprises a second laser configured to form the voids in the resin film layer.

18. The system according to claim 10, wherein the first means for forming the voids comprises a resin cutter configured to form the voids in the resin film layer.

19. The system according to claim 10, wherein the second means for impregnating the fiber reinforcement with the resin film layer comprises at least two calendaring rollers.

20. The system according to claim 19, wherein the second means for impregnating the fiber reinforcement with the resin film layer further comprises a first heating system configured to hear at least one of the at least two calendaring rollers.

* * * * *